United States Patent
Han et al.

(10) Patent No.: US 11,019,357 B2
(45) Date of Patent: May 25, 2021

(54) MOTION VECTOR PREDICTOR LIST GENERATION

(71) Applicant: QUALCOMM Incorporated, San Diego, CA (US)

(72) Inventors: Yu Han, San Diego, CA (US); Wei-Jung Chien, San Diego, CA (US); Han Huang, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/530,181

(22) Filed: Aug. 2, 2019

(65) Prior Publication Data
US 2020/0053379 A1 Feb. 13, 2020

Related U.S. Application Data

(60) Provisional application No. 62/715,703, filed on Aug. 7, 2018, provisional application No. 62/725,189, filed on Aug. 30, 2018.

(51) Int. Cl.
*H04N 19/52* (2014.01)
*H04N 19/61* (2014.01)
*H04N 19/176* (2014.01)

(52) U.S. Cl.
CPC .......... *H04N 19/52* (2014.11); *H04N 19/176* (2014.11); *H04N 19/61* (2014.11)

(58) Field of Classification Search
CPC .... H04N 19/593; H04N 19/176; H04N 19/52; H04N 19/61
See application file for complete search history.

(56) References Cited

U.S. PATENT DOCUMENTS 10,491,902 B1 * 11/2019 Xu .......................... H04N 19/43
10,523,963 B1 * 12/2019 Ye .......................... H04N 19/96
(Continued)

OTHER PUBLICATIONS

Han Y., et al., "CE4: Modification on History-based Motion Vector Prediction", 13. JVET Meeting; Jan. 9, 2019-Jan. 18, 2019; Marrakech, MA (The Joint Video Exploration Team of ISO/IEC JTC1/SC29/WG11 and ITU-T SG.16), No. JVET-M0126, Jan. 19, 2019 (Jan. 19, 2019), 9 pages, XP030202546, Retrieved from the Internet: URL: http://phenix.int-evry.fr/jvet/doc_end_user/documents/13_Marrakech/wg11/JVET-M0126-v9.zip JVET-M0126_r6.docx [retrieved on Jan. 19, 2019], the whole document.
(Continued)

*Primary Examiner* — Zaihan Jiang
(74) *Attorney, Agent, or Firm* — Shumaker & Sieffert, P.A.

(57) ABSTRACT

A video coder is configured to perform motion vector prediction to predict a motion vector for a block of video data. The motion vector prediction may use a motion vector predictor list that includes both adjacent and non-adjacent candidates relative to the current block. The video coder may divide spatial motion vector prediction candidates for a current block of video data into groups, add the spatial motion vector prediction candidates to a motion vector predictor list based on the groups, and decode a motion vector for the current block of video data based on the motion vector predictor list.

16 Claims, 12 Drawing Sheets

(56) References Cited

U.S. PATENT DOCUMENTS

| | | | |
|---|---|---|---|
| 2012/0128060 A1* | 5/2012 | Lin | H04N 19/573 375/240.02 |
| 2012/0134415 A1* | 5/2012 | Lin | H04N 19/176 375/240.16 |
| 2012/0275522 A1* | 11/2012 | Kim | H04N 19/567 375/240.16 |
| 2013/0272404 A1* | 10/2013 | Park | H04N 19/139 375/240.15 |
| 2014/0023144 A1* | 1/2014 | Park | H04N 19/52 375/240.16 |
| 2014/0126643 A1* | 5/2014 | Park | H04N 19/521 375/240.16 |
| 2014/0341284 A1* | 11/2014 | Kim | H04N 19/52 375/240.12 |
| 2014/0348241 A1* | 11/2014 | Lim | H04N 19/52 375/240.16 |
| 2015/0264386 A1 | 9/2015 | Pang et al. | |
| 2016/0381383 A1* | 12/2016 | Oh | H04N 19/107 375/240.16 |
| 2018/0288430 A1* | 10/2018 | Chen | H04N 19/52 |
| 2019/0327484 A1* | 10/2019 | Grange | H04N 19/117 |
| 2020/0036997 A1* | 1/2020 | Li | H04N 19/174 |
| 2020/0195961 A1* | 6/2020 | Toma | H04N 19/157 |

OTHER PUBLICATIONS

Han Y., et al., "CE4-Related: Simplification on Non-Adjacent Merge/Skip mode", Joint Video Experts Team (JVET) of ITU-T SG 16 WP 3 and ISO/IEC JTC 1/SC 29/WG 11, JVET-L0400, 12th Meeting: Macao, CN, Oct. 3-12, 2018, pp. 1-4.
Ma X., et al., "CE3: CCLM/MDLM Coefficients Derivation Method Using One Luma Line Buffer (Test 5.5.1 and 5.5.2)", Joint Video Experts Team (JVET) of ITU-T SG 16 WP 3 and ISO/IEC JTC 1/SC 29/WG 11, JVET-L0339_r1, 12th Meeting: Macao, CN, Oct. 3-12, 2018, pp. 1-4.
Bross B., et al., "High Efficiency Video Coding (HEVC) Text Specification Draft 10 (for FDIS & Last Call)," 12th Meeting: Geneva, CH, Jan. 14-23, 2013, (Joint Collaborative Team on Video Coding of ISO/IEC JTC 1/SC 29/WG 11 and ITU-T SG 16 WP 3); JCTVC-L1003_v34, Mar. 19, 2013, 310 pages, please consider section 8.5.3.2.5 on pp. 124 and 125, section 8.5.3.2.6 on pp. 125-128, and section 8.5.3.2.7 on pp. 128 and 129.
Bross et al., "Versatile Video Coding (Draft 5)", Joint Video Experts Team (JVET) of ITU-T SG 16 WP 3 and ISO/IEC14 UTC 1/SC 29/WG 11, 14th Meeting: Geneva, CH, Mar. 19-27, 2019, JVET-N1001-v8, 400 pp.
Chen J., et al., "Algorithm Description of Joint Exploration Test Model 1", Joint Video Exploration Team (JVET) of ITU-T SG 16 WP 3 and ISO/IEC JTC 1/SC 29/WG 11, 1nd Meeting: Geneva, CH, Oct. 19-21, 2015, 27 Pages, JVET-A1001.
Chen J., et al., "Algorithm Description of Joint Exploration Test Model 7 (JEM 7)," 7th Meeting; Joint Collaborative Team on Video Coding (JCT-VC) of ITU-T SG 16 WP 3 and ISO/IEC JTC 1/SC 29/WG 11, No. JVET-G1001v1, Jul. 13-21, 2017, 50 pp.
Chen Y-W., et al., "Description of SDR, HDR and 360° Video Coding Technology Proposal by Qualcomm and Technicolor—low and high Complexity versions", 10. JVET Meeting, Apr. 10, 2018-Apr. 20, 2018, San Diego (The Joint Video Exploration Team of ISO/IEC JTC1/SC29/WG11 and ITU-T SG.16 ), URL:http://phenix.int-evry.fr/jvet/ No. JVET-J0021-v5, Apr. 14, 2018 (Apr. 14, 2018), XP030151183, pp. 1-43, section 3: "360°"; p. 25-p. 26, figure 11, section 2.8.2.1.
Ergen S., "ZigBee/IEEE 802.15.4 Summary", Sep. 10, 2004, 37 pp.
IEEE Std 802.11ad-2012: "Part 11: Wireless LAN Medium Access Control (MAC) and Physical Layer (PHY) Specifications— Amendment 3: Enhancements for Very High Throughput in the 60 GHz Band", LAN/MAN Standards Committee of the IEEE Computer Society, Dec. 28, 2012, 628 Pages.
International Search Report and Written Opinion—PCT/US2019/045132—ISA/EPO—dated Oct. 14, 2019.
ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.
ITU-T H.265, Series H: Audiovisual and Multimedia Systems, Infrastructure of audiovisual services—Coding of moving video, Advanced video coding for generic audiovisual services, The International Telecommunication Union. Dec. 2016, 664 pp.
Li (TENCENT) G., et al., "CE4-related: extension of merge and AMVP Candidates for inter prediction", 11. JVET Meeting; Jul. 10, 2018-Jul. 18, 2018; Ljubljana, SI (The Joint Video Exploration Team of ISO/IEC JTC1/SC29/WG11 and ITU-T SG.16), No. JVET-K0301, Jul. 11, 2018 (Jul. 11, 2018), XP030199447, 5 Pages, Retrieved from the Internet: URL:http://phenix.int-evry.fr/jvet/doc_end_user/documents/11_Ljubljana/wg11/JVET-K0301-v2.zip JVET-K0301_r1.docx [retrieved on Jul. 11, 2018], figure 2, section 2, table 2.
Solovyev (Huawei) T., et al., "Non-CE4: Merge mode modification", 11. JVET Meeting; Jul. 10, 2018-Jul. 18, 2018; Ljubljana; (The Joint Video Exploration Team of ISO/IEC JTC1/SC29/WG11 and ITU-T SG.16), No. JVET-K0056, Jul. 4, 2018 (Jul. 4, 2018), XP030198953, 4 Pages, Retrieved from the Internet: URL:http://phenix.int-evry.fr/jvet/doc_end_user/documents/11_Ljubljana/wg11/JVET-K0056-v3.zip JVET-K0056-v01.docx [retrieved on Jul. 4, 2018], figure 2, sections 1 and 2.1.
Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012 (Dec. 1, 2012), pp. 1649-1668, XP011487803, ISSN: 1051-8215, DOI: 10.1109/TCSVT.2012.2221191.
Wang Y-K. et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages, please consider section 8.5.3.2.6 on p. 125, section 8.5.3.2.7 on pp. 126-129, and section 8.5.3.2.8 on pp. 129 and 130.
Zhou T., et al., "Spatial-temporal merge mode (non subblock STMVP)", 11. JVET Meeting; Jul. 10, 2018-Jul. 18, 2018; Ljubljana; (The Joint Video Exploration Team of ISO/IEC JTC1/SC29/WG11 and ITU-T SG.16), No. JVET-K0532, Jul. 13, 2018 (Jul. 13, 2018), XP030199702, Retrieved from the Internet: URL:http://phenix.int-evry.fr/jvet/doc_end_user/documents/11_Ljubljana/wg11/JVET-K0532-v1.zip JVETK0532_K0161_r2.doc [retrieved on Jul. 13, 2018], section 2.

* cited by examiner

MOTION VECTOR PREDICTOR LIST GENERATION

This application claims the benefit of U.S. Provisional Application No. 62/715,703, filed Aug. 7, 2018, and U.S. Provisional Application No. 62/725,189, filed Aug. 30, 2018, the entire content of each of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for inter-prediction coding in video codecs. In particular, this disclosure is related to motion vector predictor list constructing and pruning. The techniques of this disclosure may be applied to any of the existing video codecs, such as HEVC (High Efficiency Video Coding) or be an efficient coding tool in any future video coding standards, such as H.266/VVC (Versatile Video Coding).

In some examples, this disclosure describes techniques to generate motion vector predictors for a current block from neighboring blocks and corresponding temporal blocks. The motion vector for the current block is derived based on the motion vector predictors. In some examples, the techniques may reduce the complexity of motion vector predictor list generation through a fast pruning algorithm. The motion vector predictor list may be used in merge candidates list generation, or used in the field of other motion vector predictor list generation such as advanced motion vector prediction (AMVP) list and affine MVP list.

In one example, this disclosure describes a method of decoding video data, the method comprising dividing spatial motion vector prediction candidates for a current block of video data into groups, adding the spatial motion vector prediction candidates to a motion vector predictor list based on the groups, and decoding a motion vector for the current block of video data based on the motion vector predictor list.

In another example, this disclosure describes an apparatus configured to decode video data, the apparatus comprising a memory configured to store video data, and one or more processors in communication with the memory, the one or more processors configured to divide spatial motion vector prediction candidates for a current block of video data into groups, add the spatial motion vector prediction candidates to a motion vector predictor list based on the groups, and decode a motion vector for the current block of video data based on the motion vector predictor list.

In another example, this disclosure describes an apparatus configured to decode video data, the apparatus comprising means for dividing spatial motion vector prediction candidates for a current block of video data into groups, means for adding the spatial motion vector prediction candidates to a motion vector predictor list based on the groups, and means for decoding a motion vector for the current block of video data based on the motion vector predictor list.

In another example, this disclosure describes a non-transitory computer-readable storage medium storing instructions that, when executed, cause one or more processors configured to decode video data to divide spatial motion vector prediction candidates for a current block of video data into groups, add the spatial motion vector prediction candidates to a motion vector predictor list based on the groups, and decode a motion vector for the current block of video data based on the motion vector predictor list.

The details of one or more examples are set forth in the accompanying drawings and the description below. Other features, objects, and advantages will be apparent from the description, drawings, and claims.

DETAILED DESCRIPTION

Figure 1:
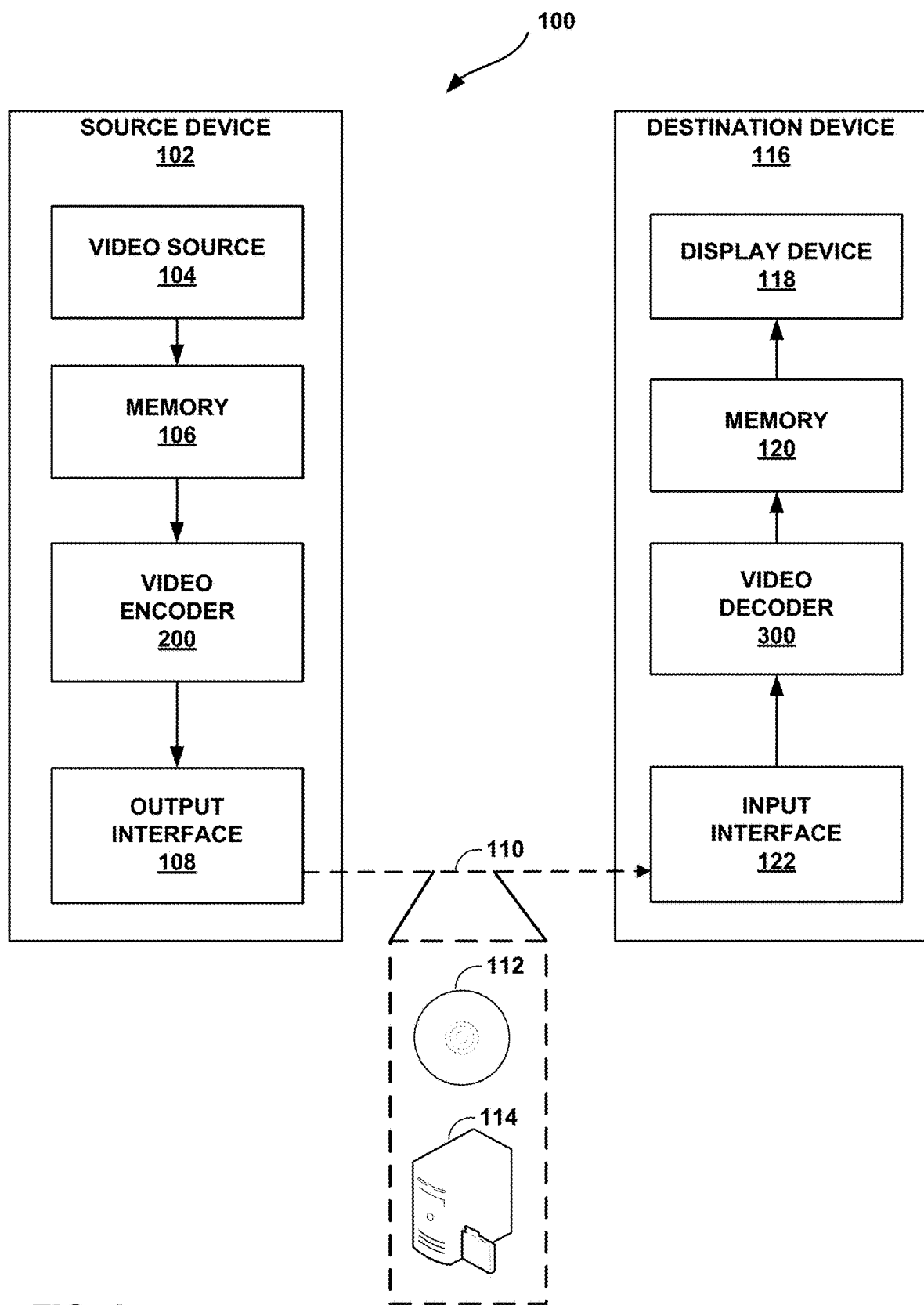
FIG. 1 is a block diagram illustrating an example video encoding and decoding system that may perform the techniques of this disclosure.

This disclosure is related to motion vector predictor selection. In video coding, such as in inter-prediction, a current block is predicted based on a prediction block. A motion vector of the current block identifies the prediction block. Signaling the <x,y> coordinates of the motion vector may require more bandwidth than motion vector predictor techniques by which a video decoder can derive the motion vector.

For example, in some motion vector predictor techniques, such as those of merge/skip mode, advanced motion vector prediction (AMVP) mode, or affine merge/AMVP mode, a video encoder and a video decoder each construct the same motion vector predictor lists that includes a list of motion vectors that form predictors for the motion vector of the current block. The motion vector predictors in the motion vector predictor list may be motion vectors of spatially neighboring or proximate blocks or motion vectors of temporal blocks (e.g., blocks in different pictures than the current picture that includes the current block being encoded or decoded).

Rather than signaling the <x,y> coordinates, the video encoder signals an index into the motion vector predictor list. The video decoder determines the motion vector predictor based on the index into the motion vector predictor list and generates the motion vector for the current block based on the motion vector predictor. For example, in merge mode, the video decoder sets the motion vector for the current block equal to the motion vector predictor. In AMVP mode, the video decoder also receives a motion vector difference (MVD) between the motion vector and the motion vector predictor. The video decoder adds the MVD to the motion vector predictor to determine the motion vector for the current block.

This disclosure describes example techniques for constructing the motion vector predictor list. For instance, one technical problem that may arise that impacts coding efficiency is that duplicates of motion vector predictors may be present in the motion vector predictor list (e.g., the same motion vector predictor is present in multiple locations in the motion vector predictor list). In such cases, there may not be sufficient space available in the motion vector predictor list, and better motion vector predictors may not be included in the motion vector predictor list because the duplicates of the motion vector predictors have used up available slots in the motion vector predictor list.

One way to overcome such deficiencies is to "prune" the motion vector predictor list to remove duplicates of motion vector predictors. However, as the size of the motion vector predictor list increases, the number of clock cycles needed to check to make sure there are not duplicates can cause a slow down in the video encoding or decoding process.

This disclosure describes one or more example techniques that provide for fast pruning even where the size of the motion vector predictor list is relatively large. For example, a video coder (e.g., video encoder or video decoder) may group neighboring blocks into sets of blocks (e.g., a first set of blocks, a second set of blocks, and so forth).

The video coder may include a motion vector of a first block in the second set of blocks. The video coder may then determine whether a motion vector for a second block in the second set of blocks is the same as the motion vector of the first block in the second set of blocks, or same as motion vector of a subset of blocks of the first set of blocks. The subset may include the first two blocks of the first set of blocks that have motion vectors, as one example.

If the motion vector for the second block is the same as any of these motion vectors, the video coder may bypass inserting (e.g., not insert or avoid inserting) the motion vector of the second block in the second set of blocks in the motion vector predictor list. If the motion vector for the second block is different than all of these motion vectors, the video coder may insert the motion vector of the second block in the second set of blocks in the motion vector predictor list.

The video coder may repeat such operations for other blocks in the second group of blocks and repeat such operations for blocks in the third group of blocks. In the above example, the first block in the second set of blocks is a block that may be the spatially closest block to the second block of the second set of blocks, and the first block may be a block that was previously checked to determine whether the motion vector of the first block is to be included in the motion vector predictor list.

In some examples, the first set of blocks include block that immediately neighbor the current block. The second, third, and so forth, set of blocks include blocks that are separated by the current block by one or more blocks.

The video coder may also determine additional motion vector predictors. For instance, the video coder may determine additional motion vector predictors based on motion vectors of blocks in the first group, motion vectors of blocks in the second group, motion vectors of blocks in the third group, and so forth. One example, the video coder may average the motion vectors of two or more blocks in the first set of blocks and a temporal motion vector predictor to determine a first additional motion vector predictor. The video coder may perform similar operations with the second set of blocks and the third set of blocks to determine two more motion vector predictors.

In this way, this disclosure describes examples of techniques to construct a motion vector predictor list in an efficient manner that the video encoder and video decoder use for inter-prediction. These example techniques may addresses technical issues present in the operation of a video coder, such as reduction in processing time, when the video coder is determining whether or not to include a motion vector predictor in the motion vector predictor list.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for pruning non-adjacent merge candidates and/or constructing a motion vector predictor list. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for pruning non-adjacent merge candidates and/or constructing a motion vector predictor list. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 116. Similarly, destination device 116 may access encoded data from storage device 116 via input interface 122. Storage device 116 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM). The techniques of this disclosure, however, are not limited to any particular coding standard.

The following describes some techniques related to video coding, such as that of a joint exploration model (JEM). Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. In addition, a new video coding standard, namely High Efficiency Video Coding (HEVC) or ITU-T H.265, including its range extension, multiview extension (MV-HEVC) and scalable extension (SHVC), has recently been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

The latest HEVC draft specification, and referred to as HEVC WD hereinafter, is available from phenix.int-evry.fr/jct/doc_end_user/documents/14_Vienna/wg11/JCTVC-N1003-v1.zip. Additional information about HEVC is available from: G. J. Sullivan; J.-R. Ohm; W.-J. Han; T. Wiegand (December 2012). "Overview of the High Efficiency Video Coding (HEVC) Standard" (PDF). IEEE Transactions on Circuits and Systems for Video Technology (IEEE) 22 (12). Retrieved 2012-09-14. Another resources is: JCTVC-L1003_v34, phenix.it-sudparis.eu/jct/doc_end_user/documents/12_Geneva/wg11/JCTVC-L1003-v34.zip.

ITU-T VCEG (Q6/16) and ISO/IEC MPEG (JTC 1/SC 29/WG 11) studied the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. And the latest version of reference software, i.e., Joint Exploration Model 7 (JEM 7) could be downloaded from: jvet.hhi.fraunhofer.de/svn/svn_HMJEMSoftware/tags/HM-16.6-JEM-73.0/. Algorithm description of Joint Exploration Test Model 7 (JEM7) could be referred to JVET-G1001: J. Chen, E. Alshina, G. J. Sullivan, J.-R. Ohm, J. Boyce, "Algorithm Description of Joint Exploration Test Model 7", JVET-G1001, July, 2017.

The Joint Video Experts Team (JVET) of ITU-T WP3/16 and ISO/IEC JTC 1/SC29/WG 11 held its eleventh meeting during 10-18 Jul. 2018 at the GR—Ljubljana Exhibition and Convention Centre (Dunajska cesta 18, 1000 Ljubljana, Slovenia). The name Versatile Video Coding (VVC) was chosen as the informal name for the new standard. The reference software VTM (VVC Test Model) and BMS (Benchmark Set) may be download from: jvet.hhi.fraunhofer.de/svn/svn_VVCSoftware_VTM/, jvet.hhi.fraunhofer.de/svn/svn_VVCSoftware_BMS/and the algorithm description could be referred to JVET-K1002: G. J. Sullivan, J. Chen, Y. Ye, S. Kim, "Algorithm description for Versatile Video Coding and Test Model 2 (VTM 2)", JVET-K1002, August 2018. A recent draft of the VVC standard is described in Bross, et al. "Versatile Video Coding (Draft 5)," Joint Video Experts Team (JVET) of ITU-T SG 16 WP 3 and ISO/IEC JTC 1/SC 29/WG 11, 14$^{th}$ Meeting: Geneva, CH, 19-27 Mar. 2019, JVET-N1001-v8 (hereinafter "VVC Draft 5"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM/VVC. According to some examples of JEM/VVC, a video coder (such as video encoder 200) partitions a picture into a plurality of coding tree units (CTUs). Video encoder 200 may partition a CTU according to a tree structure, such as a quadtree-binary tree (QTBT) structure. The QTBT structure of JEM/VVC removes the concepts of multiple partition types, such as the separation between CUs, PUs, and TUs of HEVC. A QTBT structure of JEM/VVC includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In some examples, video encoder 200 and video decoder 300 may use a single QTBT structure to represent each of the luminance and chrominance components, while in other examples, video encoder 200 and video decoder 300 may use two or more QTBT structures, such as one QTBT structure for the luminance component and another QTBT structure for both chrominance components (or two QTBT structures for respective chrominance components).

Video encoder 200 and video decoder 300 may be configured to use quadtree partitioning per HEVC, QTBT partitioning according to JEM/VVC, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

JEM/VVC also provides an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. JEM/VVC provides sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
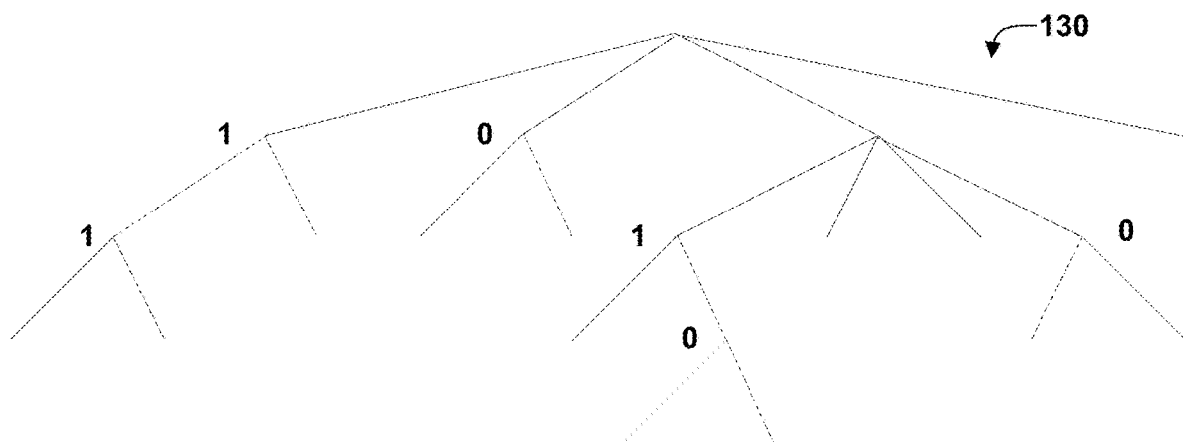
FIGS. 2A and 2B are conceptual diagrams illustrating an example quadtree binary tree (QTBT) structure, and a corresponding coding tree unit (CTU).
Figure 2B:
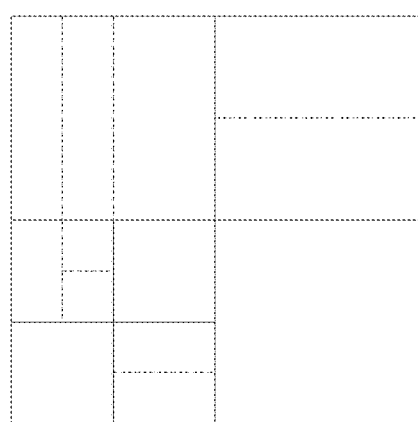

As will be explained in more detail below, video encoder 200 and video decoder 300 may be configured to divide spatial motion vector prediction candidates for a current block of video data into groups, add the spatial motion vector prediction candidates to a motion vector predictor list based on the groups, and encode/decode a motion vector for the current block of video data based on the motion vector predictor list FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

As discussed above, in HEVC, the largest coding unit in a slice is called a coding tree block (CTB) or coding tree unit (CTU). A CTB contains a quad-tree the nodes of which are coding units.

The size of a CTB can be from 16×16 to 64×64 in the HEVC main profile (although technically 8×8 CTB sizes can be supported). A coding unit (CU) could be the same size of a CTB although and as small as 8×8. Each coding unit is coded with one mode. When a CU is inter coded, the CU may be further partitioned into two or four prediction units (PUs) or become just one PU when further partitioning does not apply. When two PUs are present in one CU, the two PUs can be half size rectangles or two rectangles that are ¼ or ¾ the size of the CU.

When the CU is inter coded, one set of motion information is present for each PU. In addition, each PU is coded with a unique inter-prediction mode to derive the set of motion information.

The following reviews motion vector prediction. In the HEVC standard, there are two inter prediction modes, named merge (skip is considered as a special case of merge) and advanced motion vector prediction (AMVP) modes, respectively, for a prediction unit (PU).

In either AMVP or merge mode, video encoder 200 and video decoder 300 maintains a motion vector (MV) candidate list for multiple motion vector predictors. The MV candidate list is also referred to as motion vector predictor list. Video encoder 200 and video decoder 300 generates the motion vector(s), as well as reference indices in the merge mode, of the current PU by taking one candidate from the MV candidate list.

In some examples, the MV candidate list (or motion vector predictor list) includes up to five candidates (e.g., five motion vector predictors) for the merge mode and only two candidates (e.g., two motion vector predictors) for the AMVP mode. A merge candidate may include a set of motion information, e.g., motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode for each potential prediction direction from either list 0 or list 1, video encoder 200 explicitly signals a reference index, together with an MV predictor (MVP) index to the MV candidate list, since the AMVP candidate contains only a motion vector. In AMVP mode, the predicted motion vectors can be further refined.

As can be seen above, a merge candidate corresponds to a full set of motion information while an AMVP candidate contains just one motion vector for a specific prediction direction and reference index. The candidates for both modes are derived similarly from the same spatial and temporal neighboring blocks.

Figure 3B:
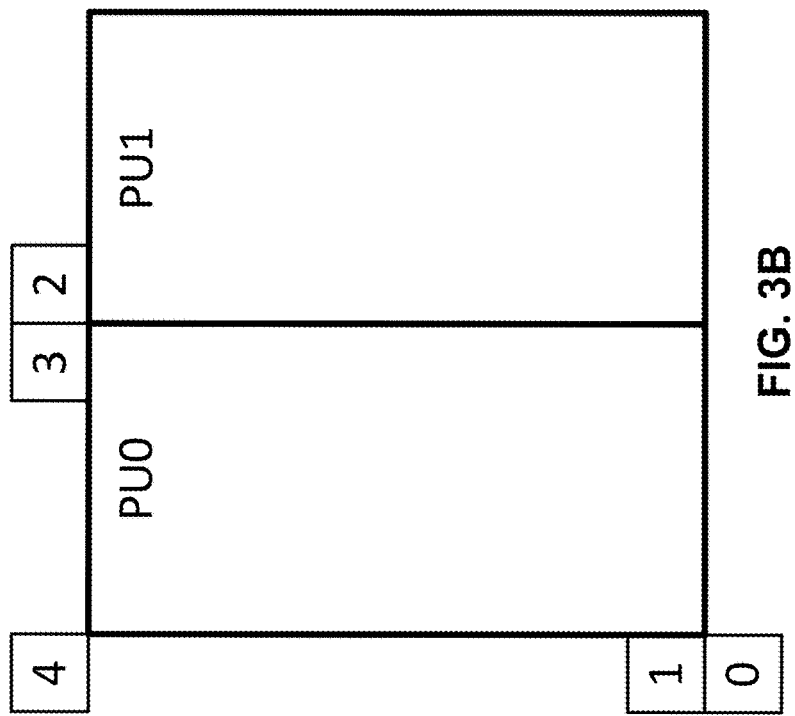
FIG. 3B is a conceptual diagram showing example spatial motion vector candidates for an advanced motion vector prediction (AMVP) mode.

The following describes spatial neighboring candidates. Spatial MV candidates are derived from the neighboring blocks, e.g., as shown in FIGS. 3A and 3B, for a specific PU ($PU_0$), although the methods generating the candidates from the blocks may differ for merge and AMVP modes.

Figure 3A:
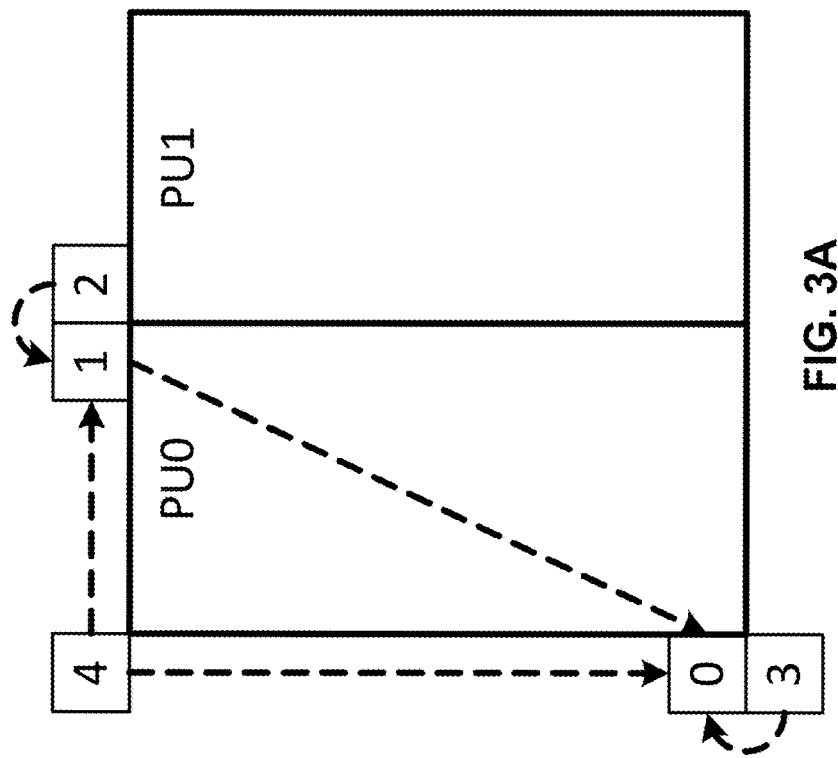
FIG. 3A is a conceptual diagram showing example spatial motion vector candidates for a merge mode.

In merge mode in HEVC, up to four spatial MV candidates can be derived with the orders shown in FIG. 3A with numbers, and the order is the following: left (0, A1), above (1, B1), above right (2, B0), below left (3, A0), and above left (4, B2), as shown in FIG. 3A. In AVMP mode, the neighboring blocks are divided into two groups: left group including block 0 and 1, and above group including blocks 2, 3, and 4, as shown in FIG. 3B. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate may be scaled to form the final candidate, thus the temporal distance differences can be compensated.

The following describes temporal motion vector prediction in HEVC. Temporal motion vector predictor (TMVP) candidate, if enabled and available, is added into the MV candidate list (e.g., motion vector predictor list) after spatial motion vector candidates. The process of motion vector derivation for TMVP candidates is the same for both merge and AMVP modes. However, the target reference index for the TMVP candidate in the merge mode is always set to 0.

Figure 4B:
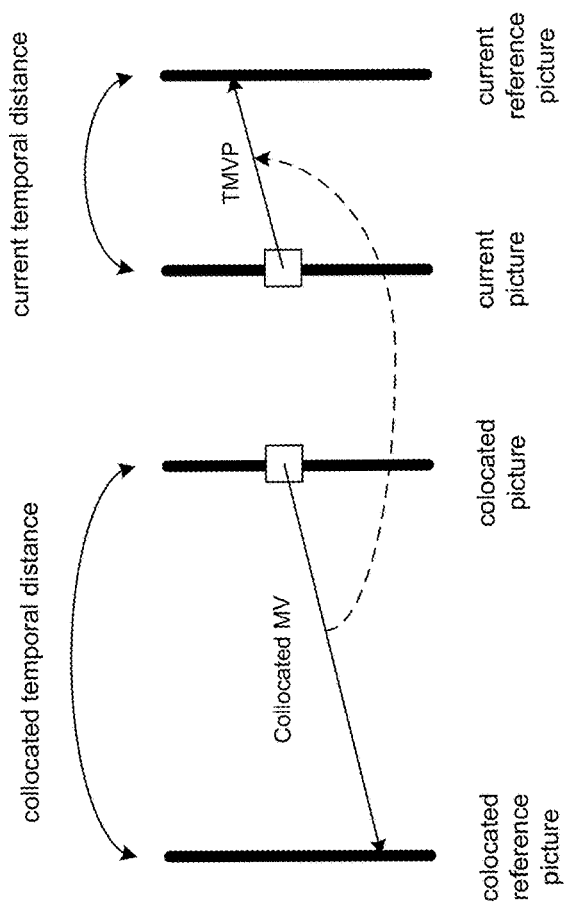
FIG. 4B is a conceptual diagram showing motion vector scaling.
Figure 4A:
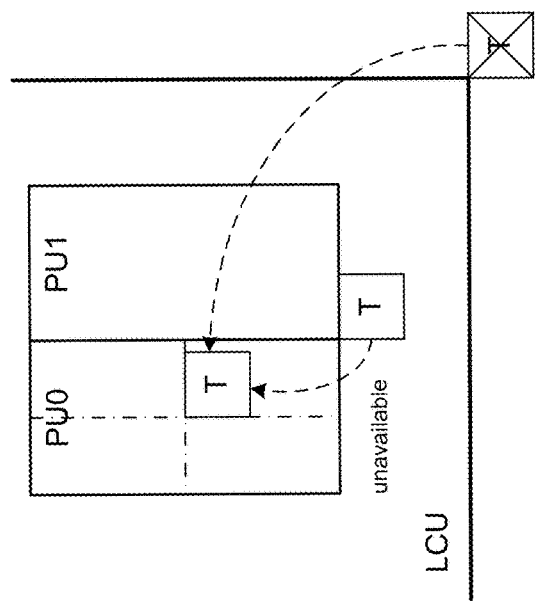
FIG. 4A is a conceptual diagram showing a temporal motion vector predictor.

The primary block location for TMVP candidate derivation is the bottom right block outside of the collocated PU, as shown in FIG. 4A as a block "T", to compensate the bias to the above and left blocks used to generate spatial neighboring candidates. However, if that block is located outside of the current CTB row or motion information is not available, the block is substituted with a center block of the PU.

A motion vector for the TMVP candidate is derived from the co-located PU of the co-located picture, indicated in the slice level. The motion vector for the co-located PU is called a collocated MV. Similar to temporal direct mode in AVC, to derive the TMVP candidate motion vector, the co-located MV may need to be scaled to compensate the temporal distance differences, as shown in FIG. 4B.

Figure 5:
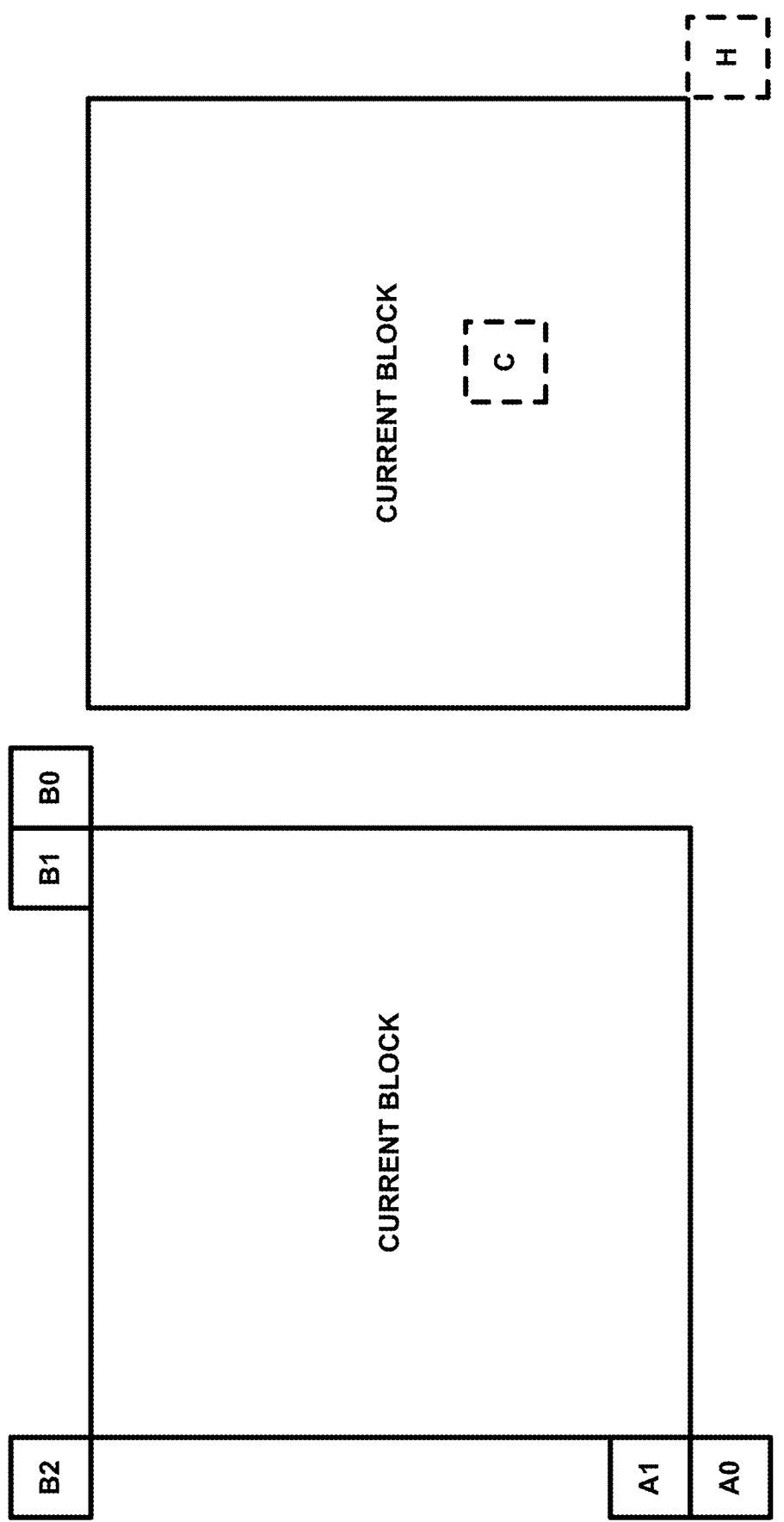
FIG. 5 is a conceptual diagram showing spatial and temporal neighboring MV candidates.

The following describes motion vector prediction in merge/skip mode. For the skip mode and merge mode, video encoder 200 may signal a merge index (e.g., for the motion vector predictor list) to indicate which candidate in the merging candidate list is used. No inter prediction indicator, reference index, or MVD is transmitted. Two types of merging candidates are considered in merge mode: spatial motion vector predictors (SMVP) and temporal motion vector predictors (TMVP). In HEVC, for SMVP derivation, a maximum of four merge candidates are selected among candidates that are located in positions as depicted in FIG. 5. The order of derivation is $A_1 \rightarrow B_1 \rightarrow B_0 \rightarrow A_0 \rightarrow (B_2)$. Position $B_2$ is considered only when any PU of position $A_1$, $B_1$, $B_0$, $A_0$ is not available, is intra coded, or the total number of candidates, after pruning, from positions $A_1$, $B_1$, $B_0$, $A_0$ is less than four.

In the derivation of a TMVP, a scaled motion vector is derived based on co-located PU belonging to one of the reference pictures of current picture within the signaled reference picture list. The reference picture list to be used for derivation of the co-located PU is explicitly signaled in the slice header. The scaled motion vector for temporal merge candidate is obtained with the scaled motion vector of the co-located PU using the picture order count (POC) distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC draft specification. For a B-slice, two motion vectors (one is for reference picture list 0 and the other is for reference picture list 1) are obtained and combined to make the bi-predictive merge candidate.

The position of co-located PU is selected between two candidate positions, C and H, as depicted in FIG. 5. If PU at position H is not available, is intra coded, or is outside of the current CTU row, position C is used. Otherwise, position H is used for the derivation of the temporal merge candidate.

Besides SMVPs and TMVPs, there are two additional types of synthetic merge candidates: combined bi-predictive MVP and zero MVP. Combined bi-predictive MVP are generated by utilizing SMVPs and TMVPs. In HEVC, combined bi-predictive merge candidate is used for B-Slices only. For example, two candidates in the original merge candidate list, which have mvL0 and refIdxL0 or mvL1 and refIdxL1, are used to create a combined bi-predictive merge candidate.

In the process of candidate selection, duplicated candidates having the same motion parameters as previous candidates in the processing order are removed from the candidate list. This process is defined as pruning process. Also, candidates inside the same merge estimation region (MER) are not considered, in order to help parallel merge processing. Redundant partition shape is avoided in order to not emulate a virtual 2N×2N partition.

Between each generation step, the derivation process is stopped if the number of candidates reaches a maximum number of merge candidates (MaxNumMergeCand). In the current common test condition, MaxNumMergeCand is set equal to five. Since the number of candidates is constant, the index of the selected merge candidate is encoded using truncated unary binarization (TU).

The following describes some additional aspects of motion prediction in HEVC. Several aspects of merge and AMVP modes are described as follows.

Video encoder 200 and video decoder 300 may perform motion vector scaling. It is assumed that the value of motion vectors is proportional to the distance of pictures in the presentation time. A motion vector associates two pictures: the reference picture, and the picture containing the motion vector (namely the containing picture). When a motion vector is utilized to predict the other motion vector, the distance of the containing picture and the reference picture is calculated based on the Picture Order Count (POC) values.

For a motion vector to be predicted, both its associated containing picture and reference picture may be different. Therefore, video encoder 200 and video decoder 300 may calculate a new distance based on the POC and may scale the motion vector based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Video encoder 200 and video decoder 300 may perform artificial motion vector candidate generation. If a motion vector candidate list is not complete (e.g., has less than a predetermined number of candidates), video encoder 200 and video decoder 300 may generate artificial motion vector candidates and insert the artificial motion vector candidates at the end of the list until it the list has the predetermined number of candidates.

In merge mode, there are two types of artificial MV candidates: combined candidate derived only for B-slices and zero candidates used only for AMVP if the first type does not provide enough artificial candidates.

For each pair of candidates that are already in the candidate list and have the necessary motion information, bi-directional combined motion vector candidates are derived by a combination of the motion vector of the first candidate referring to a picture in the list 0 and the motion vector of a second candidate referring to a picture in the list 1.

In some examples, video encoder 200 and video decoder 300 may perform a pruning process for candidate insertion. Candidates from different blocks may happen to be the same, which decreases the efficiency of a merge/AMVP candidate list. A pruning process is applied to address this problem. The pruning process compares one candidate against the others in the current candidate list to avoid inserting identical candidates in certain examples. In some examples, to reduce the complexity, only a limited number of pruning processes are applied instead of comparing each potential candidate with all the other existing candidates.

Figure 6:
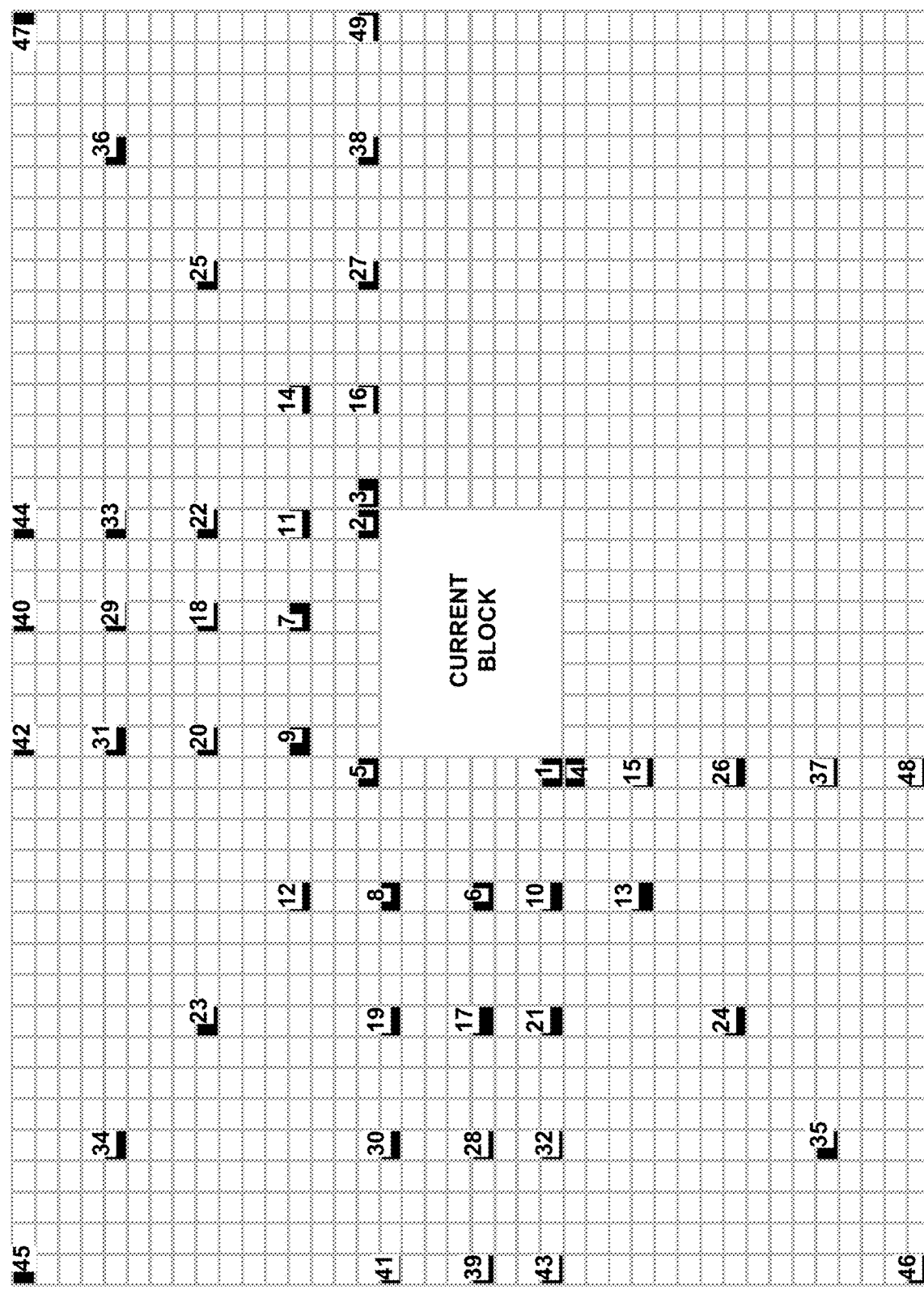
FIG. 6 is a conceptual diagram showing non-adjacent merge candidates.

The following describes non-adjacent spatial neighboring candidates. Non-adjacent (e.g., blocks that are not immediately neighboring the current block) spatial merge candidate prediction techniques are proposed for the future video coding standards, such as VVC. Such techniques increase the size of the merge candidate list by filling in the merge candidate list from non-adjacent spatial neighboring blocks. FIG. 6 illustrates examples of non-adjacent spatial neighboring blocks (e.g., blocks that are not immediately neighboring the current block). In FIG. 6, blocks identified as 1-5 may be adjacent blocks to the current block (e.g., immediately neighboring), and blocks identified as 6-49 may be non-adjacent to the current block (e.g., not immediately neighboring but proximate). In some examples, the numbers associated with the blocks shown in FIG. 6 may represent the order in which adjacent and non-adjacent motion vector prediction candidates are added into a motion vector predictor list.

The design of HEVC/JEM/VVC/VTM/BMS may have the following problems. Some examples of VVC (e.g., non-adjacent merge candidates) use a larger number of motion vector predictors. An increase in the number motion vector predictors in inter prediction can improve coding efficiency. When generating a motion vector predictor list, video encoder 200 and video decoder 300 may apply a pruning process to avoid adding duplicate candidates into the motion vector predictor list. When the motion vector predictor list increases in size, more and more pruning operations are used, which increases the complexity of video encoder 200 and video decoder 300 (e.g., video encoder 200 and video decoder 300 may need to expend clock cycles with the pruning operation, thereby slowing down encoding and decoding), as well as the time needed to construct the motion vector predictor list.

In accordance with the one or more of techniques of this disclosure described below, a video coder (e.g., video encoder 200 or video decoder 300) may generate motion vector predictors from the neighboring blocks of a current block (e.g., immediately neighboring and non-immediately neighboring blocks) and corresponding temporal blocks. The techniques of this disclosure may reduce the complexity of motion vector predictor list generation and pruning through a fast pruning algorithm. The techniques of this disclosure may be used in merge candidates list generation. The techniques of this disclosure may also be used in the field of other motion vector predictor list generation, such as AMVP list and affine MVP lists. The techniques of this disclosure may also be used in the field of intra most probable mode (MPM) list generation.

Group Based Pruning

In one example of the disclosure, when video encoder 200 and/or video decoder 300 adds one predictor into a motion vector candidate list, video encoder 200 and/or video decoder 300 may perform a pruning operation between a portion (e.g., a subset) of the candidates, and may avoid comparing all of the candidates in the list for pruning to reduce complexity. In general, when performing pruning, video encoder 200 and video decoder 300 may only compare the next motion vector predictor to be added to the motion vector predictor list to a subset of candidates already in the list.

In one example of the disclosure, video encoder 200 and/or video decoder 300 may divide the potential motion vector predictor candidates into different groups, and perform pruning inside the same group. In another example, video encoder 200 and/or video decoder 300 may divide the potential motion vector predictor candidates into different groups, and may preform pruning inside the same group and/or between some of the different groups.

Grouping

In one example of the disclosure, the motion vector predictors candidates for inter prediction (or most probable mode (MPM) for intra prediction) can be divided into different groups according to the distance (e.g., in samples) the motion vector predictor candidate block is to the current coding block. For example, the candidates are divided into different groups based on the vertical and horizontal distance (e.g., in samples to the current coding block using function (1):

$$\text{Group\_i} | x <= \text{threshold\_group\_i\_x} \ \&\& \ y <= \text{threshold\_group\_i\_y} \quad (1)$$

Group_i is the group of candidates, threshold_group_i_x is the threshold distance in the horizontal direction for each value of i, and threshold_group_i_y is the threshold distance in the vertical direction for each value of i.

Figure 7:
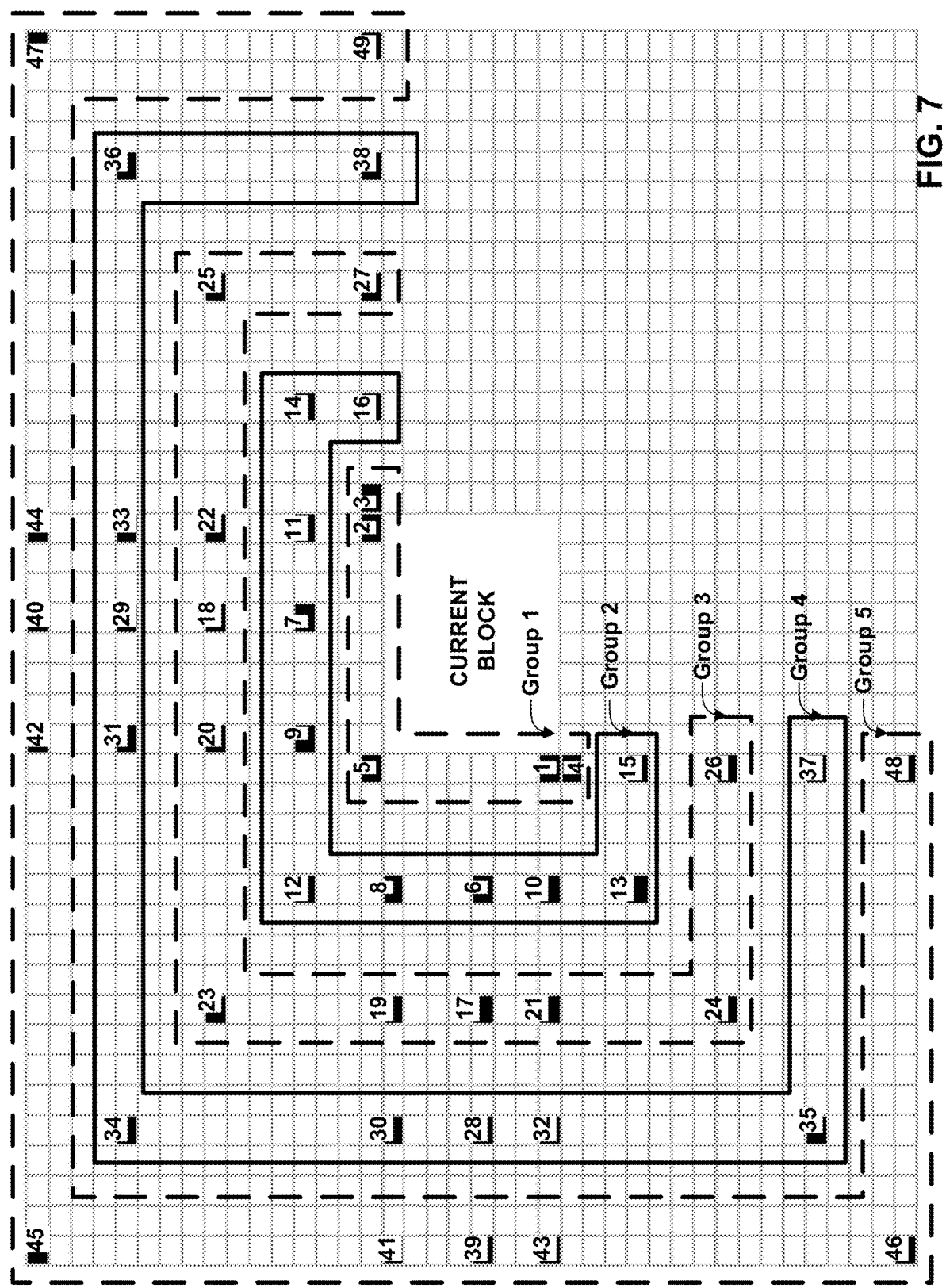
FIG. 7 is another conceptual diagram showing non-adjacent merge candidates in groups.

For example, as shown in FIG. 7, the basic block unit is 4×4. Group_i represents the candidates with the threshold_group_i_x and threshold_group_i_y equal to (i−1)×32. As shown in FIG. 7, using equation (1) above, candidates 1-49 are divided into 5 groups. Like FIG. 6, the number of each candidate indicates that order in which the candidate is considered to be added to the motion vector candidate list. If the candidate block has an associated motion vector, the motion vector is added to the candidate list subject to one or more of the pruning processes described below. As shown in FIG. 7, Group 1 includes candidates 1-5.

Group 2 includes candidates 6-16. Group 3 includes candidates 17-27. Group 4 includes candidates 28-38. Group 5 includes candidates 39-49.

Video encoder 200 and/or video decoder 300 may add the candidates from the group which is nearest to the current coding block first until video encoder 200 and/or video decoder 300 adds enough candidates to reach the maximum number of candidates defined for the list. For example, video encoder 200 and video decoder 300 may add candidates from Group 1 to the motion vector predictor list first. If the number of candidates added to the motion vector predictor list is less than a predefined maximum number of candidates, video encoder 200 and video decoder 300 may then add candidates from Group 2 to the motion vector predictor list, and so on.

As another example, video encoder 200 and/or video decoder 300 may be configured to divide the candidates into different groups based on the vertical and horizontal distance to the current coding block using function (2):

$$\text{Group\_}i|(x^2+y^2)<=\text{threshold\_group\_}i \qquad (2)$$

In this example, threshold_group_i is a function of both the vertical and horizontal distance.

In other examples, video encoder 200 and video decoder 300 may divide the motion vector predictors candidates for inter prediction into different groups based on prediction direction, prediction mode, and/or reference POC. Video encoder 200 and/or video decoder 300 may include the candidates with the same feature (e.g., same prediction direction, prediction mode, and/or reference POC) into the same group.

Pruning Number

As one example, video encoder 200 and/or video decoder 300 may perform pruning within the same group. That is, in some examples, video encoder 200 and video decoder 300 may only perform pruning on candidates from within the same group. For example, with reference to FIG. 7, video encoder 200 and video decoder 300 prune group 1 candidates with reference to other group 1 candidates, video encoder 200 and video decoder 300 prune group 2 candidates with reference to other group 2 candidates, and so on. For example, define N<number of candidates in a group. When checking a new candidate, video encoder 200 and/or video decoder 300 only perform pruning with the available candidates already in the list (<=N).

As another example, video encoder 200 and/or video decoder 300 perform pruning between different groups. For example, define $M_i$ to be the number for pruning in the $Group_i$. When checking a new candidate for the current group, video encoder 200 and/or video decoder 300 perform pruning between the candidates in the current group with the $M_i$ candidates in the $Group_i$.

As another example, video encoder 200 and/or video decoder 300 perform pruning depending on the position of the current candidate and the position of the candidates already considered to be added to the list (candidates with a smaller number in FIG. 7). When two candidates are close to each other, pruning may be applied. Whether or not two candidates are considered to be "close' may be defined as a Euclidean distance (straight-line distance), distance in vertical or horizontal samples, or another distance measure.

In one example, video encoder 200 and/or video decoder 300 perform pruning between the candidates which are close to the current one. For example, with reference to FIG. 7, when checking candidate 20, video encoder 200 and/or video decoder 300 may perform pruning with candidate 9 and candidate 18, which are the closest to candidate 20. As another example, when checking candidate 13, video encoder 200 and/or video decoder 300 perform pruning with all or a subset of candidates 1, 4, 10 and 14, which are the closest to candidate 13. In other examples, video encoder 200 and/or video decoder 300 perform pruning with the first close candidate in the process order to further reduce the complexity.

Motion Vector Predictor Pruning

When performing pruning, video encoder 200 and/or video decoder 300 may compare the reference direction, and/or reference index, and/or POC, and/or motion vector values (with/without scaling) between two motion vector predictors. If one or more of these characteristics are the same, video encoder 200 and/or video decoder 300 do not add this motion vector predictor to the candidate list. In other examples, each of the reference direction, and/or reference index, and/or POC, and/or motion vector values (with/without scaling) between two motion vector predictors must be the same for video encoder 200 and video decoder 300 to prune the later added candidate from the motion vector predictor list.

Parameters Coding

In one example, the number of groups, the number of candidates in each group, the number of candidates for pruning in the group, and the threshold of different group can be predefined, fixed, or dependent on one or more of the CTU size, and/or current coding block size, and/or the position of the candidates, and/or prediction mode.

For example, video encoder 200 may encode syntax elements indicating one or more of the number of groups, the number of candidates in different groups, the number of candidates for pruning in the group, and the threshold of different group via the sequence parameter set (SPS), picture parameter set (PPS), at the slice header, or at the CU level.

Example:

In one example, assume the size of the candidate list is 11. That is, the predetermined maximum number of candidates in the motion vector predictor list is 11 candidates. As shown in FIG. 7, video encoder 200 and/or video decoder 300 may be configured to check the candidates in group 1 at first according to the checking order as specified in the FIG. 7 (e.g., 1-5), or the spatial and temporal merge candidates in HEVC, or other merge generation methods. When checking a candidate from group 1, video encoder 200 and/or video decoder 300 may perform pruning with some or all of the candidates which have been added in the list. After all of the candidates in group 1 have been checked, video encoder 200 and/or video decoder 300 add candidates from group 2. When checking a candidate from group 2, video encoder 200 and/or video decoder 300 perform pruning with the first two candidates from group 1 if available, and also preform pruning with its closest neighbor candidates which have already been considered to be added in the list. For example, the closest neighboring candidates of candidate 10 is candidate 6 and candidate 1. If candidate 6 and/or candidate 1 have been added in the list, video encoder 200 and/or video decoder 300 may perform pruning between candidate 10 and candidate 6 and/or candidate 1. If the number of candidates in the list is less than 11, video encoder 200 and/or video decoder 300 go on checking the candidates from the next group. In another example, video encoder 200 and/or video decoder 300 may perform pruning only with a subset of the close neighboring candidates in order to reduce complexity, where the closeness may be defined by a threshold in distance (e.g., using equations (1) or (2) above).

In accordance with the above-described techniques, in one example of the disclosure, video decoder 300 may be configured to divide spatial motion vector prediction candidates for a current block of video data into groups, add the spatial motion vector prediction candidates to a motion vector predictor list based on the groups, and decode a motion vector for the current block of video data based on the motion vector predictor list.

In some examples of the disclosure, to divide spatial motion vector prediction candidates for the current block of video data into groups, video decoder 300 is configured to divide spatial motion vector prediction candidates for the current block of video data into groups based on a vertical and horizontal distance to the current block of video data. In other examples of the disclosure, to add the spatial motion vector prediction candidates to the motion vector predictor list based on the groups, video decoder 300 is configured to prune the spatial motion vector prediction candidates based on the groups. In other examples, to prune the spatial motion vector prediction candidates based on the groups, video decoder 300 is configured to prune only the spatial motion vector prediction candidates within the same group.

Figure 8:
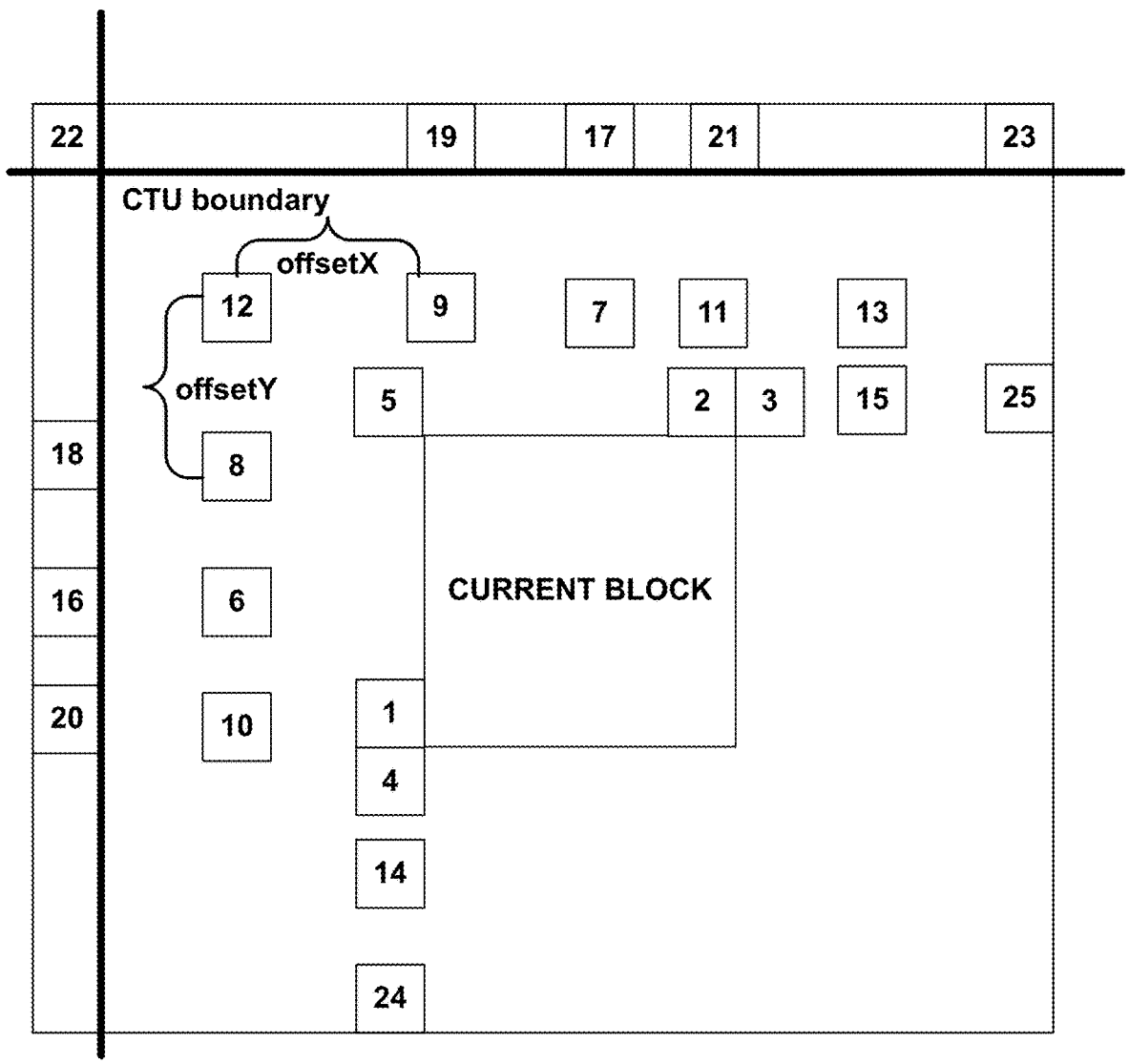
FIG. 8 is a conceptual diagram showing additional examples of spatial neighboring blocks used to derive spatial merge candidates.

FIG. 8 is a conceptual diagram showing additional examples of spatial neighboring blocks used to derive spatial merge candidates. In FIG. 8, the block indicates the basic unit for storing motion information and other coding mode information. The numbered blocks in FIG. 8 illustrate the locations of candidate spatial neighboring blocks (e.g., immediately and non-immediately neighboring blocks) that are used to derive the spatial merge candidates. Video encoder 200 and/or video decoder 300 may construct the candidate list (e.g., motion vector predictor list) by checking the numbered blocks in the ascending order of the numbers. If a block is inter-prediction coded, the video encoder 200 and/or video decoder 300 may fetch and store motion information and use as a potential candidate. Video encoder 200 and/or video decoder 300 may perform a pruning process by comparing the potential candidate with the existing candidates. A potential candidate is pruned (e.g., the insertion of the candidate in the motion vector predictor list is bypassed) if video encoder 200 and/or video decoder 300 determines that an existing candidate has the same motion information. Video encoder 200 and/or video decoder 300 inserts the potential candidate into the candidate list (e.g., motion vector predictor list) if video encoder 200 and/or video decoder 300 does not prune the potential candidate. The candidate list (e.g., motion vector predictor list) construction process terminates when the number of candidates reaches a predefined maximum number.

As one example, assume the size of the candidate list (e.g., motion vector predictor list) is 10, video encoder 200 and/or video decoder 300 may perform the following process, which is terminated when the number of candidates in the list reaches 10.

1. Check the first group of potential candidates of blocks 1, 2, 3, 4, and 5 (see FIG. 8). If the candidate block has an available motion vector, add the candidate block into motion vector predictor list.
2. Check the second group of potential candidates from blocks 6 to 15. When checking a candidate from the second group, perform pruning by comparing the motion vector of the currently checked candidate with the first two available candidates from the first group, and also preform pruning with the closest neighbor candidate which has a lower number and is already in the candidate list. For example, when checking the candidate at block 10, the closest neighboring candidate is candidate 6. If candidate 6 has been added in the list, the pruning is performed by comparing candidate 10 with 6. The closest neighboring candidate of candidate 14 is candidate 4. The closest neighboring candidate of candidate 15 is candidate 13.
3. Check the candidates from the third group of potential candidates from block 16 to 25. When checking a candidate from the third group, perform pruning with the first two available candidates from the first group, and also preform pruning with the closest neighbor candidate which has a lower number and is already in the candidate list. For example, the closest neighboring candidate of candidate 21 is candidate 17. If candidate 17 has been added in the list, video encoder 200 and video decoder 300 will perform pruning between candidate 21 and 17. The closest neighboring candidate of candidate 24 is candidate 14. The closest neighboring candidate of candidates 25 is candidate 23.

In this example, video encoder 200 and video decoder 300 may perform the pruning operation through comparing the reference direction, and/or reference index, and/or POC, and/or motion vector (with/without scaling) between two motion vector predictors. For motion vector predictor pruning, video encoder 200 and video decoder 300 may compare the reference direction, and/or reference index, and/or POC, and/or motion vector (with/without scaling) between two motion vector predictors. If the characteristics of the motion information are the same, video encoder 200 and video decoder 300 may not add this motion vector predictor to the candidate list.

In some examples, video encoder 200 and video decoder 300 may be configured to generate three more spatial-temporal motion vectors predictors (STMVPs) from spatial neighing blocks and a corresponding temporal block. Video encoder 200 and video decoder 300 may generate an STMVP by average three candidates. If one of the three candidates is not available, then video encoder 200 and video decoder 300 may generate the STMVP by average the two available candidates.

For example, video encoder 200 and video decoder 300 may average the motion vectors of candidate 3 and 4 from the first group and the temporal motion vector predictor (TMVP) to generate an STMVP1. Video encoder 200 and video decoder 300 may average the motion vectors of candidate 14 and candidate 15 from the second group and the TMVP to generate an STMVP2. Video encoder 200 and video decoder 300 may average the motion vectors of candidate 24 and candidate 25 from the third group and the TMVP to generate an STMVP3.

Video encoder 200 and video decoder 300 may add the STMVP as the leading candidates in the second and third group. Video encoder 200 and video decoder 300 may add STMVP1 and STMVP2 before the second group candidates. Video encoder 200 and video decoder 300 may add STMVP3 before the third group candidates. In some examples, video encoder 200 and video decoder 300 may perform pruning between the STMVP and the first 2 available spatial candidates from the first group.

In some examples, video encoder 200 and video decoder 300 may derive STMVP1 by averaging the following two or three candidates: 1) the first available candidate of candidate 3 and candidate 2, 2) the first available candidate of candidate 4 and candidate 1, 3) the TMVP.

In some examples, video encoder 200 and video decoder 300 may derive STMVP1 by averaging the following two or three candidates: 1) candidate 3, if candidate 3 is not available, then use candidate 2, 2) candidate 4, if candidate 4 is not available, then use candidate 1, 3) the TMVP.

In some examples, video encoder 200 and video decoder 300 may generate the STMVP from the candidates that have been added in the predictor list. Video encoder 200 and video decoder 300 may average the motion vector of any two spatial candidates in the list and the TMVP.

In the above examples, it may be possible to restrict which neighboring blocks are considered. For example, video encoder 200 and video decoder 300 may operate according to a line buffer restriction to reduce buffer usage. The potential spatial candidates are restricted to be within the current CTU and its line buffer. As shown in FIG. 8 and the function below:

$$\text{offsetYUpperCTURow}=((\text{posLT}\cdot y>>\log 2\text{MaxCodingBlockSize})<<\log 2\text{MaxCodingBlockSize})-\text{minPUSize}-\text{posLT}\cdot y$$

$$\text{offsetXLeftCTUColumn}=((\text{posLT}\cdot x>>\log 2\text{MaxCodingBlockSize})<<\log 2\text{MaxCodingBlockSize})-\text{minPUSize}-\text{posLT}\cdot x$$

$$\text{offsetY}=\text{offsetY}<\text{offsetUpperCTURow}?\text{offsetUpperCTURow}:\text{offsetY}$$

$$\text{offsetX}=\text{offsetX}<\text{offsetLeftCTURow}?\text{offsetLeftCTURow}:\text{offsetX}$$

The following describes how parameters may be coded. For example, the number of groups, the number of candidates in each group, the number of candidates for pruning in the group, and the threshold of different group can be predefined, fixed or depending on CTU size, and/or current coding block size, and/or the position of the candidates, and/or prediction mode. In one example, video encoder 200 may encode syntax elements indicating the number of groups, the number of candidates in different groups, the number of candidates for pruning in the group, and the threshold of different group via the SPS, PPS, or the slice header, or CU level.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In accordance with the above-described techniques, in one example of the disclosure, video decoder 300 may be configured to divide spatial motion vector prediction candidates for a current block of video data into groups, add the spatial motion vector prediction candidates to a motion vector predictor list based on the groups, and decode a motion vector for the current block of video data based on the motion vector predictor list. The spatial motion vector prediction candidates may include adjacent motion vector prediction candidates and non-adjacent motion vector prediction candidates.

In one example, video decoder 300 may be configured to add first motion vector prediction candidates from a first group of the groups into the motion vector predictor list, wherein the first group includes adjacent motion vector prediction candidates, add second motion vector prediction candidates from a second group of the groups into the motion vector predictor list, wherein the second group includes non-adjacent motion vector prediction candidates located at a first threshold distance from the current block of video data, and add third motion vector prediction candidates from a third group of the groups into the motion vector predictor list, wherein the third group includes non-adjacent motion vector prediction candidates located at a second threshold distance from the current block of video data.

Video decoder 300 may be further configured to prune spatial motion vector prediction candidates from the second group based on motion vector prediction candidates from the first group and a closest motion vector prediction candidate in the second group, and prune spatial motion vector prediction candidates from the third group based on motion vector prediction candidates from the first group and a closest motion vector prediction candidate in the third group To prune the spatial motion vector prediction candidates from the second group based on the spatial motion vector prediction candidates from the first group and the closest motion vector prediction candidate in the second group, video decoder 300 may be configured to determine whether a motion vector for a candidate in the second group is the same as a motion vector of either of a first two candidates of the first group or the same as a motion vector of a closest motion vector prediction candidate in the second group, and based on the determination that the motion vector for the candidate in the second group is not the same as the motion vector of the first two candidates of the first group and not the same as the motion vector of the closest motion vector prediction candidate in the second group, add the motion vector for the candidate in the second group in the motion vector predictor list, or based on the determination that the motion vector for the candidate in the second group is the same as the motion vector of either of the first two candidates of the first group or the same as the motion vector of the closest motion vector prediction candidate in the second group, not add the motion vector for the candidate in the second group in the motion vector predictor list.

In another example, to prune the spatial motion vector prediction candidates from the third group based on the spatial motion vector prediction candidates from the first group and the closest motion vector prediction candidate in the third group, video decoder 300 may be configured to determine whether a motion vector for a candidate in the third group is the same as a motion vector of either of a first two candidates of the first group or the same as a motion vector of a closest motion vector prediction candidate in the third group, and based on the determination that the motion vector for the candidate in the third group is not the same as the motion vector of the first two candidates of the first group and not the same as the motion vector of the closest motion vector prediction candidate in the third group, add the motion vector for the candidate in the third group in the motion vector predictor list, or based on the determination that the motion vector for the candidate in the third group is the same as the motion vector of either of the first two candidates of the first group or the same as the motion vector of the closest motion vector prediction candidate in the third group, not add the motion vector for the candidate in the third group in the motion vector predictor list.

In other examples, video decoder 300 may be configured to generate a spatial-temporal motion vector predictor (STMVP) and adding the STMVP to the motion vector predictor list. To generate the STMVP, video decoder 300 may be configured to average one or more of the spatial motion vector prediction candidates with a temporal motion vector predictor.

Other examples of the disclosure are described below.

In one example, a method of coding video data comprises constructing a motion vector predictor list for a current block, wherein constructing the motion vector predictor list comprises determining motion vectors for blocks of a first set of blocks, determining a first motion vector for a first block of a second set of blocks, determining a second motion vector for a second block of the second set of blocks, determining whether the second motion vector is the same as the first motion vector for the first block of the second set of blocks or the same as a motion vector of a block from a subset of blocks of the first set of blocks, and one of based on the determination that the second motion vector is not the same as the first motion vector for the first block of the second set of blocks and not the same as any motion vector of any block from the subset of blocks of the first set of blocks, inserting the second motion vector as a motion vector predictor in the motion vector predictor list, or based on the determination that the second motion vector is the same as the first motion vector for the first block of the second set of blocks or is the same as a motion vector of any block from the subset of blocks of the first set of blocks, bypassing inserting the second motion vector as a motion vector predictor in the motion vector predictor list, and inter-prediction coding the current block based on the motion vector predictor list.

The method may further include inserting the determined motion vectors for the first set of blocks in the motion vector prediction list.

In some examples, the first block of the second set of blocks is a block that is the spatially closest block to the second block, and a block that was previously checked to determine whether the first motion vector is to be included in the motion vector predictor list.

The method may further include determining a third motion vector for a third block of a third set of blocks, determining a fourth motion vector for a fourth block of the third set of blocks, determining whether the fourth motion vector is the same as the third motion vector for the third block of the third set of blocks or the same as any motion vector of any block from the subset of blocks of the first set of blocks, and one of based on the determination that the fourth motion vector is not the same as the third motion vector for the third block of the third set of blocks and not the same as a motion vector of any block from the subset of blocks of the first set of blocks, inserting the fourth motion vector as a motion vector predictor in the motion vector predictor list, or based on the determination that the fourth motion vector is the same as the third motion vector for the third block of the third set of blocks or is the same as a motion vector of any block from the subset of blocks of the first set of blocks, bypassing inserting the fourth motion vector as a motion vector predictor in the motion vector predictor list.

In some examples, the third block of the third set of blocks is a block that is the spatially closest block to the fourth block, and a block that was previously checked to determine whether the third motion vector is to be included in the motion vector predictor list.

In some examples, the first set of blocks comprise blocks that immediately neighbor the current block, and wherein the second set of blocks comprise blocks that are separated by the current block by one or more blocks.

The method may further include determining one or more motion vector predictors based on motion vectors of blocks in the first, second, or third group of blocks.

In some examples, determining one or more motion vector predictors comprises determining a first motion vector predictor based on two motion vectors of blocks in the first set of blocks and a temporal motion vector predictor, determining a second motion vector predictor based on two motion vectors of blocks in the second set of blocks and the temporal motion vector predictor, and determining a third motion vector predictor based on two motion vectors of blocks in the third set of blocks and the temporal motion vector predictor.

In some examples, determining the one or more motion vector predictors comprises determining the one or more motion vector predictors based on motion vector predictors inserted into the motion vector predictor list.

In some examples, the blocks in the first, second, and/or third set of blocks are restricted to within a current coding tree unit (CTU) that includes the current block and in a line buffer of the CTU.

In some examples, the method of coding video data comprises a method of decoding video data, wherein inter-prediction coding comprises inter-prediction decoding, and wherein inter-prediction decoding comprises receiving an index into the motion vector predictor list, determining a motion vector predictor based on the index, determining a current motion vector for the current block based on the motion vector predictor, determining a prediction block based on the current motion vector, determining a residual block indicative of differences between the prediction block and the current block, and reconstructing the current block by adding the residual block to the prediction block.

In other examples, the method of coding video data comprises a method of encoding video data, wherein inter-prediction coding comprises inter-prediction encoding, and wherein inter-prediction encoding comprises determining a prediction block, wherein the prediction block is identified by a motion vector for the current block, wherein the motion vector for the current block is derivable by a video decoder based on a motion vector predictor identified in the motion vector predictor list, determining an index into the motion vector predictor list that identifies the motion vector predictor, determining a residual block based on a difference between the prediction block and the current block, and signaling information indicative of the residual block and the index into the motion vector predictor list.

In another example, a method of coding video data comprises constructing a motion vector predictor list for a current block, wherein constructing the motion vector predictor list comprises determining motion vectors for blocks of a first set of blocks, determining a first motion vector for a first block of a second set of blocks, determining a second motion vector for a second block of the second set of blocks, determining that the second motion vector is the same as the first motion vector for the first block of the second set of blocks or the same as a motion vector of a block from a subset of blocks of the first set of blocks, and based on the determination that the second motion vector is the same as the first motion vector for the first block of the second set of blocks or is the same as a motion vector of any block from the subset of blocks of the first set of blocks, bypassing inserting the second motion vector as a motion vector predictor in the motion vector predictor list, and inter-prediction coding the current block based on the motion vector predictor list.

In another example, a method of coding video data comprises constructing a motion vector predictor list for a current block, wherein constructing the motion vector predictor list comprises determining motion vectors for blocks of a first set of blocks, determining a first motion vector for a first block of a second set of blocks, determining a second motion vector for a second block of the second set of blocks, determining that the second motion vector is not the same as the first motion vector for the first block of the second set of blocks and not the same as a motion vector of a block from a subset of blocks of the first set of blocks, and based on the determination that the second motion vector is not the same as the first motion vector for the first block of the second set of blocks and not the same as any motion vector of any block from the subset of blocks of the first set of blocks, inserting the second motion vector as a motion vector predictor in the motion vector predictor list, and inter-prediction coding the current block based on the motion vector predictor list.

Figure 9:
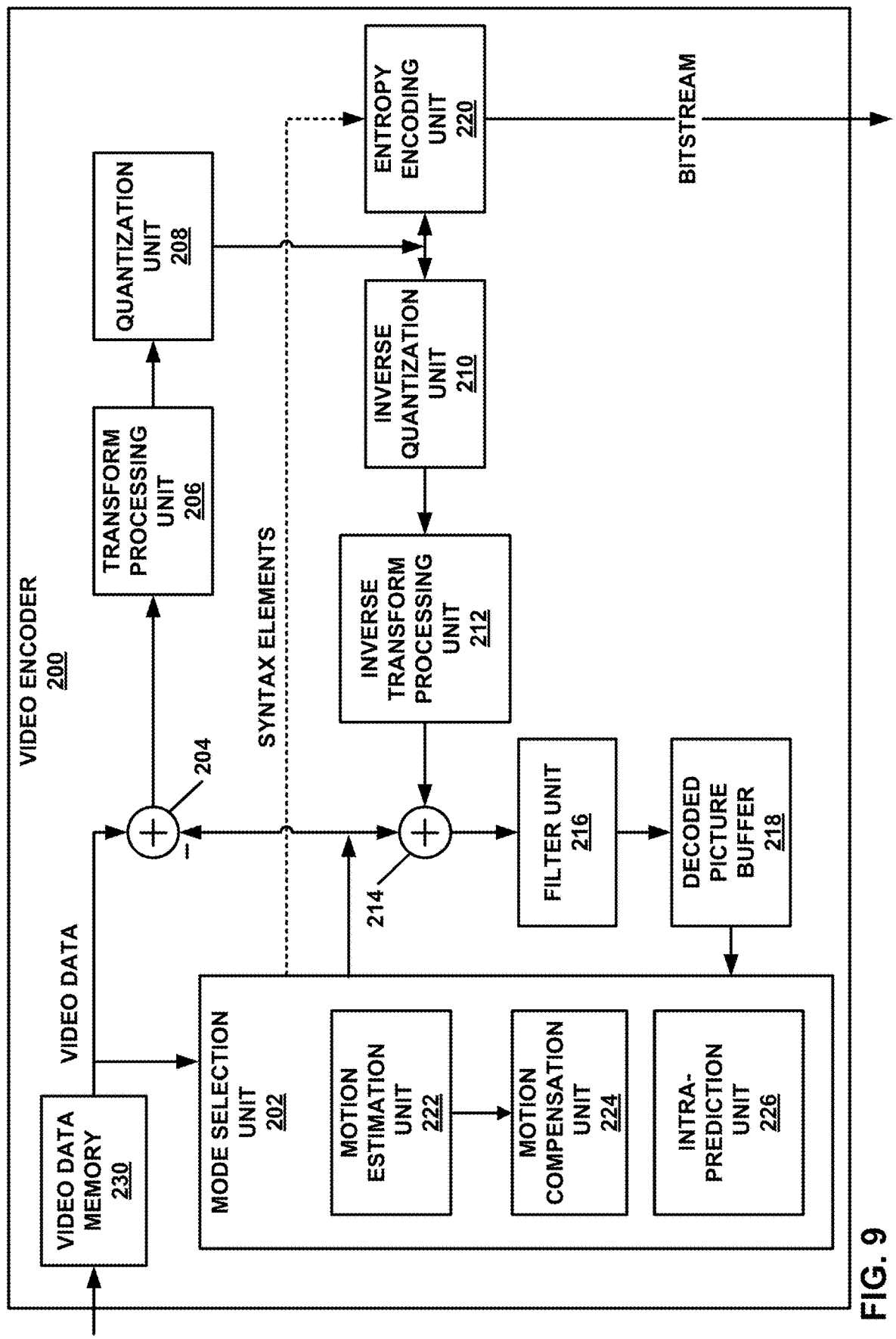
FIG. 9 is a block diagram illustrating an example video encoder that may perform the techniques of this disclosure.

FIG. 9 is a block diagram illustrating an example video encoder 200 that may perform the techniques of this disclosure. FIG. 9 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 9, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random-access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 9 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like.

Motion estimation unit 222 may generally perform these calculations using sample-by-sample differences between the current block and the reference block being considered. Motion estimation unit 222 may identify a reference block having a lowest value resulting from these calculations, indicating a reference block most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

In accordance with techniques of the disclosure described above, motion estimation unit 22 and/or motion compensation unit 224 may be configured to perform any techniques of the disclosure for motion vector predictor list construction and pruning. In general, video encoder 200 may be configured to divide spatial motion vector prediction candidates for a current block of video data into groups, add the spatial motion vector prediction candidates to a motion vector predictor list based on the groups, and encode a motion vector for the current block of video data based on the motion vector predictor list.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 200 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to encode video data including a memory configured to store video data, and one or more processing units implemented in circuitry and configured to construct a motion vector predictor list for a current block, and inter-prediction encode the current block based on the motion vector predictor list.

To construct the motion vector predictor list, video encoder 200 may be configured to determine motion vectors for blocks of a first set of blocks, determine a first motion vector for a first block of a second set of blocks, determine a second motion vector for a second block of the second set of blocks and determine whether the second motion vector is the same as the first motion vector for the first block of the second set of blocks or the same as a motion vector of a block from a subset of blocks of the first set of blocks. Video encoder 200 may be configured to, one of, based on the determination that the second motion vector is not the same as the first motion vector for the first block of the second set of blocks and not the same as any motion vector of any block from the subset of blocks of the first set of blocks, insert the second motion vector as a motion vector predictor in the motion vector predictor list, or based on the determination that the second motion vector is the same as the first motion vector for the first block of the second set of blocks or is the same as a motion vector of any block from the subset of blocks of the first set of blocks, bypass inserting (e.g., not insert or avoid inserting) the second motion vector as a motion vector predictor in the motion vector predictor list.

In some examples, to inter-prediction encode the current block, video encoder 200 may determine a prediction block. The prediction block is identified by a motion vector for the current block, and the motion vector for the current block is derivable by video decoder 300 based on a motion vector predictor identified in the motion vector predictor list. Video encoder 200 may determine an index into the motion vector predictor list that identifies the motion vector predictor, determine a residual block based on a difference between the prediction block and the current block and signal information indicative of the residual block and the index into the motion vector predictor list.

Figure 10:
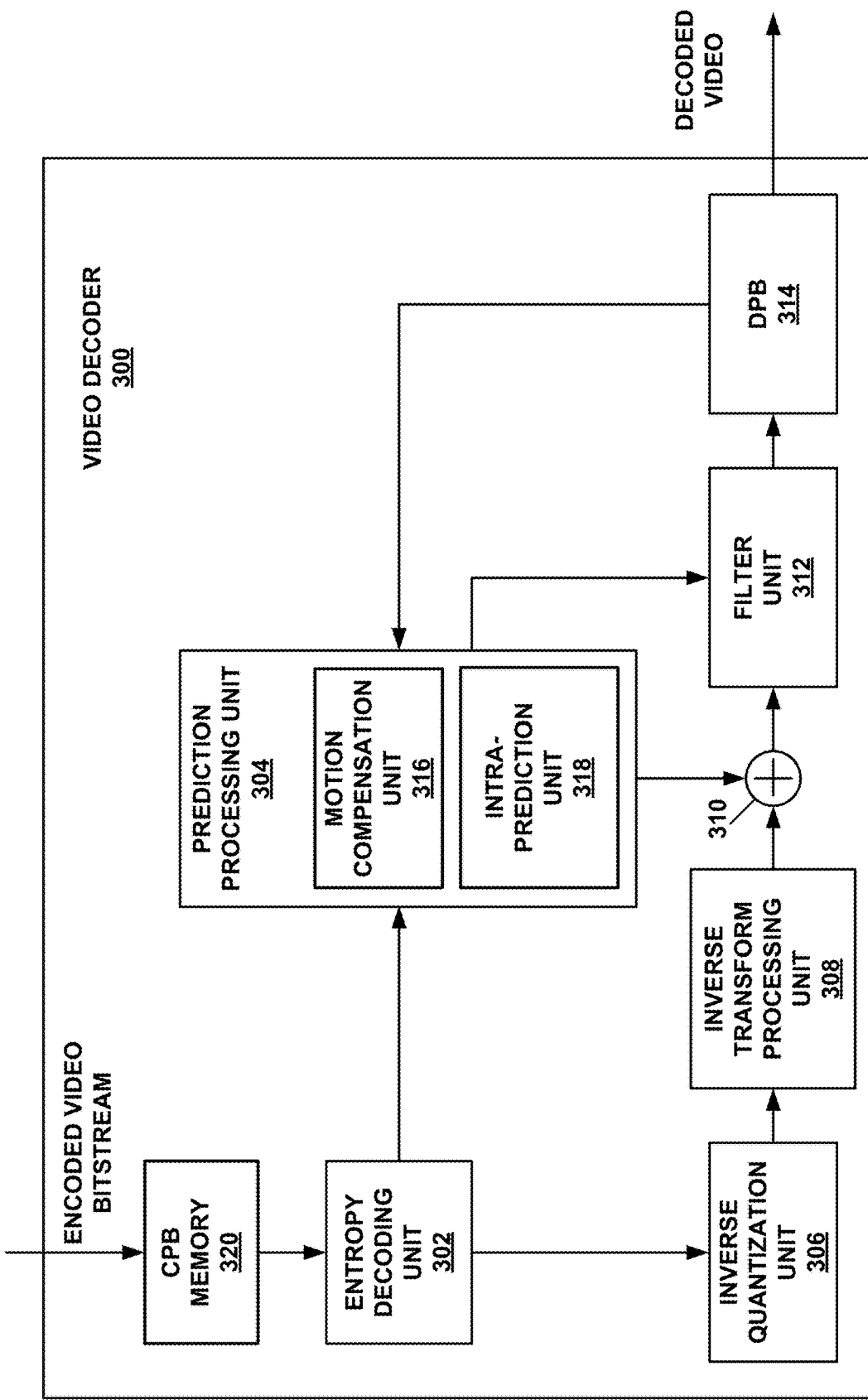
FIG. 10 is a block diagram illustrating an example video decoder that may perform the techniques of this disclosure.

FIG. 10 is a block diagram illustrating an example video decoder 300 that may perform the techniques of this disclosure. FIG. 10 is provided for purposes of explanation and is not limiting on the techniques as broadly exemplified and described in this disclosure. For purposes of explanation, this disclosure describes video decoder 300 is described according to the techniques of JEM/VVC and HEVC. However, the techniques of this disclosure may be performed by video coding devices that are configured to other video coding standards.

In the example of FIG. 10, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random-access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 10 are illustrated to assist with understanding the operations performed by video decoder 300. The units may be implemented as fixed-function circuits, programmable circuits, or a combination thereof. Similar to FIG. 9, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 9).

In accordance with techniques of the disclosure described above, motion compensation unit 316 may be configured to perform any techniques of the disclosure for motion vector predictor list construction and pruning. In general, video decoder 300 may be configured to divide spatial motion vector prediction candidates for a current block of video data into groups, add the spatial motion vector prediction candidates to a motion vector predictor list based on the groups, and decode a motion vector for the current block of video data based on the motion vector predictor list.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 9). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data, and one or more processing units implemented in circuitry and configured to construct a motion vector predictor list for a current block, and inter-prediction decode the current block based on the motion vector predictor list. To construct the motion vector predictor list, video decoder 300 may determine motion vectors for blocks of a first set of blocks, determine a first motion vector for a first block of a second set of blocks, determine a second motion vector for a second block of the second set of blocks, and determine whether the second motion vector is the same as the first motion vector for the first block of the second set of blocks or the same as a motion vector of a block from a subset of blocks of the first set of blocks. Video decoder 300 may be configured to, one of based on the determination that the second motion vector is not the same as the first motion vector for the first block of the second set of blocks and not the same as any motion vector of any block from the subset of blocks of the first set of blocks, insert the second motion vector as a motion vector predictor in the motion vector predictor list, or based on the determination that the second motion vector is the same as the first motion vector for the first block of the second set of blocks or is the same as a motion vector of any block from the subset of blocks of the first set of blocks, bypassing insert (e.g., not insert or avoid inserting) the second motion vector as a motion vector predictor in the motion vector predictor list.

In some examples, to inter-prediction decode, video decoder 300 may be configured to receive an index into the motion vector predictor list, determine a motion vector predictor based on the index, determine a current motion vector for the current block based on the motion vector predictor; determine a prediction block based on the current motion vector, determine a residual block indicative of differences between the prediction block and the current block, and reconstruct the current block by adding the residual block to the prediction block.

Figure 11:
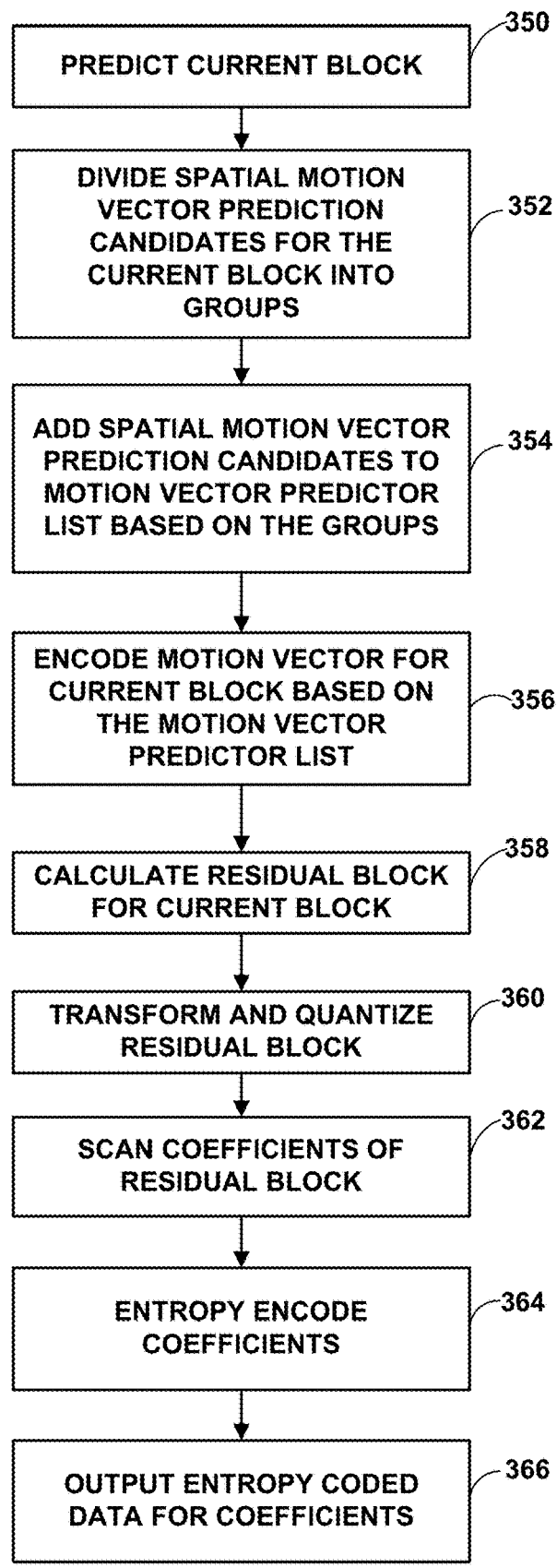
FIG. 11 is a flowchart illustrating an example encoding method.

FIG. 11 is a flowchart illustrating an example method for encoding a current block. The current block may comprise a current CU. Although described with respect to video encoder 200 (FIGS. 1 and 8), it should be understood that other devices may be configured to perform a method similar to that of FIG. 11.

In this example, video encoder 200 initially predicts the current block (350). For example, video encoder 200 may form a prediction block for the current block. Video encoder 200 may divide spatial motion vector prediction candidates for a current block of video data into groups (352), add the spatial motion vector prediction candidates to a motion vector predictor list based on the groups (354), and encode a motion vector for the current block of video data based on the motion vector predictor list (356).

Video encoder 200 may then calculate a residual block for the current block (358) based on the prediction block identified by the motion vector. To calculate the residual block, video encoder 200 may calculate a difference between the original, uncoded block and the prediction block for the current block. Video encoder 200 may then transform and quantize coefficients of the residual block (360). Next, video encoder 200 may scan the quantized transform coefficients of the residual block (362). During the scan, or following the scan, video encoder 200 may entropy encode the coefficients (364). For example, video encoder 200 may encode the coefficients using CAVLC or CABAC. Video encoder 200 may then output the entropy coded data of the block (366).

Figure 12:
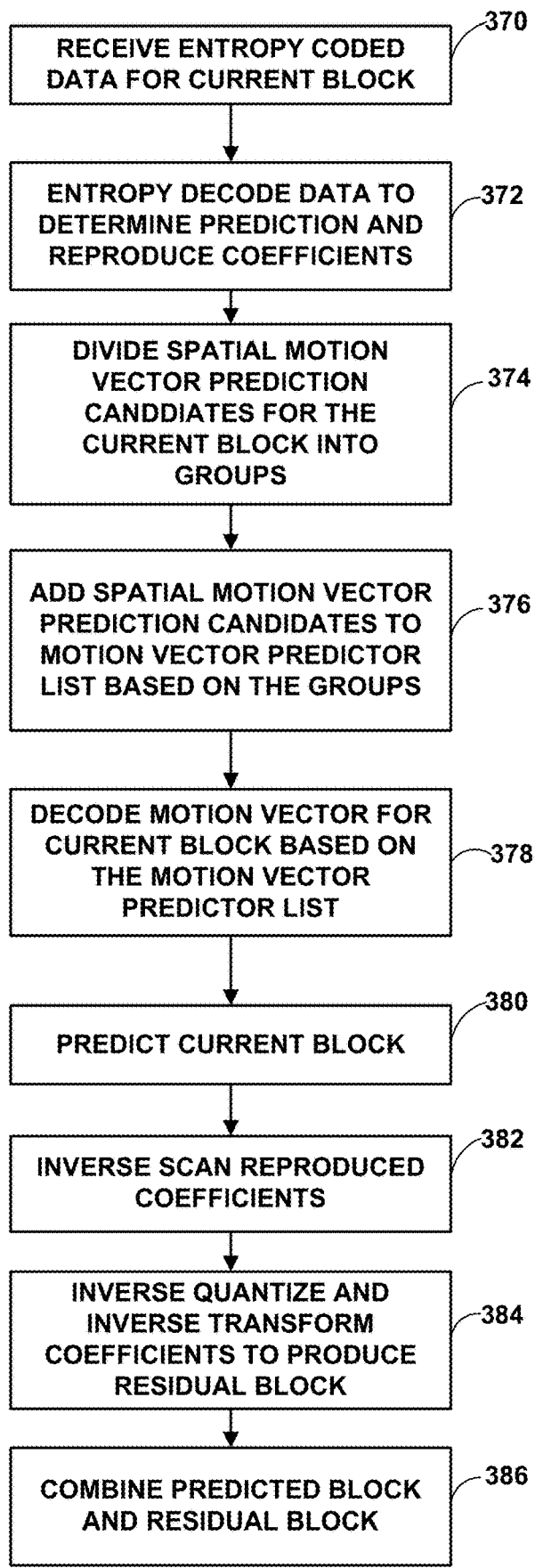
FIG. 12 is a flowchart illustrating an example decoding method.

FIG. 12 is a flowchart illustrating an example method for decoding a current block of video data. The current block may comprise a current CU. Although described with respect to video decoder 300 (FIGS. 1 and 9), it should be understood that other devices may be configured to perform a method similar to that of FIG. 12.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372).

Video decoder may divide spatial motion vector prediction candidates for a current block of video data into groups (374), add the spatial motion vector prediction candidates to a motion vector predictor list based on the groups (376), and decode a motion vector for the current block of video data based on the motion vector predictor list (378).

Video decoder 300 may predict the current block (380), e.g., using an inter-prediction mode as indicated by the prediction information (e.g., the decoded motion vector) for the current block, to calculate a prediction block for the current block. Video decoder 300 may then inverse scan the reproduced coefficients (382), to create a block of quantized transform coefficients. Video decoder 300 may then inverse quantize and inverse transform the coefficients to produce a residual block (384). Video decoder 300 may ultimately decode the current block by combining the prediction block and the residual block (386).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    dividing spatial motion vector prediction candidates for a current block of video data into groups, wherein the spatial motion vector prediction candidates include adjacent motion vector prediction candidates and non-adjacent motion vector prediction candidates, wherein the non-adjacent motion vector prediction candidates include candidates from blocks that are not immediately neighboring the current block of video data;
    adding first motion vector prediction candidates from a first group of the groups into a motion vector predictor list, wherein the first group includes the adjacent motion vector prediction candidates;
    adding second motion vector prediction candidates from a second group of the groups into the motion vector predictor list, wherein the second group includes one or more of the non-adjacent motion vector prediction candidates located at least a first threshold distance from the current block of video data, and wherein the first group and the second group are different from one another;
    adding third motion vector prediction candidates from a third group of the groups into the motion vector predictor list, wherein the third group includes one or more of the non-adjacent motion vector prediction candidates located at a second threshold distance from the current block of video data;
    pruning spatial motion vector prediction candidates from the second group based on motion vector prediction candidates from the first group and a closest motion vector prediction candidate in the second group;
    pruning spatial motion vector prediction candidates from the third group based on motion vector prediction candidates from the first group and a closest motion vector prediction candidate in the third group; and
    decoding a motion vector for the current block of video data based on the motion vector predictor list.

2. The method of claim 1, wherein pruning the spatial motion vector prediction candidates from the second group based on the spatial motion vector prediction candidates from the first group and the closest motion vector prediction candidate in the second group comprises:
    determining whether a motion vector for a candidate in the second group is the same as a motion vector of either of a first two candidates of the first group or the same as a motion vector of a closest motion vector prediction candidate in the second group;
    based on the determination that the motion vector for the candidate in the second group is not the same as the motion vector of the first two candidates of the first group and not the same as the motion vector of the closest motion vector prediction candidate in the second group, adding the motion vector for the candidate in the second group in the motion vector predictor list; or
    based on the determination that the motion vector for the candidate in the second group is the same as the motion vector of either of the first two candidates of the first group or the same as the motion vector of the closest motion vector prediction candidate in the second group, not adding the motion vector for the candidate in the second group in the motion vector predictor list.

3. The method of claim 1, wherein pruning the spatial motion vector prediction candidates from the third group based on the spatial motion vector prediction candidates from the first group and the closest motion vector prediction candidate in the third group comprises:
    determining whether a motion vector for a candidate in the third group is the same as a motion vector of either of a first two candidates of the first group or the same as a motion vector of a closest motion vector prediction candidate in the third group;

based on the determination that the motion vector for the candidate in the third group is not the same as the motion vector of the first two candidates of the first group and not the same as the motion vector of the closest motion vector prediction candidate in the third group, adding the motion vector for the candidate in the third group in the motion vector predictor list; or based on the determination that the motion vector for the candidate in the third group is the same as the motion vector of either of the first two candidates of the first group or the same as the motion vector of the closest motion vector prediction candidate in the third group, not adding the motion vector for the candidate in the third group in the motion vector predictor list.

4. The method of claim 1, further comprising:
generating a spatial-temporal motion vector predictor (STMVP) and adding the STMVP to the motion vector predictor list.

5. The method of claim 4, wherein generating the STMVP comprises:
averaging one or more of the spatial motion vector prediction candidates with a temporal motion vector predictor.

6. The method of claim 1, wherein dividing spatial motion vector prediction candidates for the current block of video data into groups comprises dividing spatial motion vector prediction candidates for the current block of video data into groups based on a vertical and horizontal distance to the current block of video data.

7. The method of claim 1, further comprising:
decoding the current block of video data using the motion vector.

8. An apparatus configured to decode video data, the apparatus comprising:
a memory configured to store video data; and
one or more processors in communication with the memory, the one or more processors configured to:
divide spatial motion vector prediction candidates for a current block of video data into groups, wherein the spatial motion vector prediction candidates include adjacent motion vector prediction candidates and non-adjacent motion vector prediction candidates, wherein the non-adjacent motion vector prediction candidates include candidates from blocks that are not immediately neighboring the current block of video data;
add first motion vector prediction candidates from a first group of the groups into a motion vector predictor list, wherein the first group includes the adjacent motion vector prediction candidates;
add second motion vector prediction candidates from a second group of the groups into the motion vector predictor list, wherein the second group includes one or more of the non-adjacent motion vector prediction candidates located at least a first threshold distance from the current block of video data, and wherein the first group and the second group are different from one another;
add third motion vector prediction candidates from a third group of the groups into the motion vector predictor list, wherein the third group includes one or more of the non-adjacent motion vector prediction candidates located at a second threshold distance from the current block of video data;

prune spatial motion vector prediction candidates from the second group based on motion vector prediction candidates from the first group and a closest motion vector prediction candidate in the second group;

prune spatial motion vector prediction candidates from the third group based on motion vector prediction candidates from the first group and a closest motion vector prediction candidate in the third group; and decode a motion vector for the current block of video data based on the motion vector predictor list.

9. The apparatus of claim 8, wherein to prune the spatial motion vector prediction candidates from the second group based on the spatial motion vector prediction candidates from the first group and the closest motion vector prediction candidate in the second group, the one or more processors are further configured to:
determine whether a motion vector for a candidate in the second group is the same as a motion vector of either of a first two candidates of the first group or the same as a motion vector of a closest motion vector prediction candidate in the second group;

based on the determination that the motion vector for the candidate in the second group is not the same as the motion vector of the first two candidates of the first group and not the same as the motion vector of the closest motion vector prediction candidate in the second group, add the motion vector for the candidate in the second group in the motion vector predictor list; or based on the determination that the motion vector for the candidate in the second group is the same as the motion vector of either of the first two candidates of the first group or the same as the motion vector of the closest motion vector prediction candidate in the second group, not add the motion vector for the candidate in the second group in the motion vector predictor list.

10. The apparatus of claim 8, wherein to prune the spatial motion vector prediction candidates from the third group based on the spatial motion vector prediction candidates from the first group and the closest motion vector prediction candidate in the third group, the one or more processors are further configured to:
determine whether a motion vector for a candidate in the third group is the same as a motion vector of either of a first two candidates of the first group or the same as a motion vector of a closest motion vector prediction candidate in the third group;

based on the determination that the motion vector for the candidate in the third group is not the same as the motion vector of the first two candidates of the first group and not the same as the motion vector of the closest motion vector prediction candidate in the third group, add the motion vector for the candidate in the third group in the motion vector predictor list; or based on the determination that the motion vector for the candidate in the third group is the same as the motion vector of either of the first two candidates of the first group or the same as the motion vector of the closest motion vector prediction candidate in the third group, not add the motion vector for the candidate in the third group in the motion vector predictor list.

11. The apparatus of claim 8, wherein the one or more processors are further configured to:
generate a spatial-temporal motion vector predictor (STMVP) and adding the STMVP to the motion vector predictor list.

12. The apparatus of claim 11, wherein to generate the STMVP, the one or more processors are further configured to:
   average one or more of the spatial motion vector prediction candidates with a temporal motion vector predictor.

13. The apparatus of claim 8, wherein to divide spatial motion vector prediction candidates for the current block of video data into groups, the one or more processors are further configured to:
   divide spatial motion vector prediction candidates for the current block of video data into groups based on a vertical and horizontal distance to the current block of video data.

14. The apparatus of claim 8, wherein the one or more processors are further configured to:
   decode the current block of video data using the motion vector.

15. An apparatus configured to decode video data, the apparatus comprising:
   means for dividing spatial motion vector prediction candidates for a current block of video data into groups, wherein the spatial motion vector prediction candidates include adjacent motion vector prediction candidates and non-adjacent motion vector prediction candidates, wherein the non-adjacent motion vector prediction candidates include candidates from blocks that are not immediately neighboring the current block of video data;
   means for adding first motion vector prediction candidates from a first group of the groups into a motion vector predictor list, wherein the first group includes the adjacent motion vector prediction candidates;
   means for adding second motion vector prediction candidates from a second group of the groups into the motion vector predictor list, wherein the second group includes one or more of the non-adjacent motion vector prediction candidates located at least a first threshold distance from the current block of video data, and wherein the first group and the second group are different from one another;
   means for adding third motion vector prediction candidates from a third group of the groups into the motion vector predictor list, wherein the third group includes one or more of the non-adjacent motion vector prediction candidates located at a second threshold distance from the current block of video data;
   means for pruning spatial motion vector prediction candidates from the second group based on motion vector prediction candidates from the first group and a closest motion vector prediction candidate in the second group;
   means for pruning spatial motion vector prediction candidates from the third group based on motion vector prediction candidates from the first group and a closest motion vector prediction candidate in the third group; and
   means for decoding a motion vector for the current block of video data based on the motion vector predictor list.

16. A non-transitory computer-readable storage medium storing instructions that, when executed, cause one or more processors configured to decode video data to:
   divide spatial motion vector prediction candidates for a current block of video data into groups, wherein the spatial motion vector prediction candidates include adjacent motion vector prediction candidates and non-adjacent motion vector prediction candidates, wherein the non-adjacent motion vector prediction candidates include candidates from blocks that are not immediately neighboring the current block of video data;
   add first motion vector prediction candidates from a first group of the groups into a motion vector predictor list, wherein the first group includes the adjacent motion vector prediction candidates;
   add second motion vector prediction candidates from a second group of the groups into the motion vector predictor list, wherein the second group includes one or more of the non-adjacent motion vector prediction candidates located at least a first threshold distance from the current block of video data, and wherein the first group and the second group are different from one another;
   add third motion vector prediction candidates from a third group of the groups into the motion vector predictor list, wherein the third group includes one or more of the non-adjacent motion vector prediction candidates located at a second threshold distance from the current block of video data;
   prune spatial motion vector prediction candidates from the second group based on motion vector prediction candidates from the first group and a closest motion vector prediction candidate in the second group;
   prune spatial motion vector prediction candidates from the third group based on motion vector prediction candidates from the first group and a closest motion vector prediction candidate in the third group; and
   decode a motion vector for the current block of video data based on the motion vector predictor list.

* * * * *